United States Patent
Hong et al.

(10) Patent No.: US 11,892,799 B2
(45) Date of Patent: *Feb. 6, 2024

(54) IMAGE FORMING APPARATUS FOR GUIDING REFILLING OPERATION OF TONER

(71) Applicant: Hewlett-Packard Development Company, L.P., Spring, TX (US)

(72) Inventors: Jongwon Hong, Pangyo (KR); Haneol Yoon, Pangyo (KR); Mok-Hwa Lim, Seongnam Si (KR); Jang-Geun Kim, Seongnam Si (KR); Hyeonseung Lee, Pangyo (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,163

(22) Filed: Jan. 13, 2023

(65) Prior Publication Data
US 2023/0152749 A1     May 18, 2023

Related U.S. Application Data

(63) Continuation of application No. 17/044,822, filed as application No. PCT/US2019/028348 on Apr. 19, 2019, now Pat. No. 11,586,142.

(30) Foreign Application Priority Data

Apr. 26, 2018    (KR) .................. 10-2018-0048674

(51) Int. Cl.
    *G06F 3/12*              (2006.01)
    *G03G 21/18*            (2006.01)
    (Continued)

(52) U.S. Cl.
    CPC ..... *G03G 21/1889* (2013.01); *G03G 15/0856* (2013.01); *G03G 15/5016* (2013.01);
    (Continued)

(58) Field of Classification Search
    None
    See application file for complete search history.

(56) References Cited

U.S. PATENT DOCUMENTS 5,610,692 A    3/1997   Trask et al.
6,188,852 B1   2/2001   Ojima et al.
(Continued)

FOREIGN PATENT DOCUMENTS

JP     2001-242752 A    9/2001
JP     2002-288389 A    10/2002
(Continued)

*Primary Examiner* — Dung D Tran
(74) *Attorney, Agent, or Firm* — Foley & Lardner LLP

(57) ABSTRACT

Provided is a method of operating an image forming apparatus. The method includes: calculating a remaining lifespan of at least one component consumed through an image forming job in the image forming apparatus; determining whether to proceed with a refill operation to refill a toner in a cartridge of the image forming apparatus, based on the remaining lifespan of the at least one component; and displaying guide information to guide the refill operation based on a result of the determining.

20 Claims, 16 Drawing Sheets

(51) Int. Cl.
  *G03G 15/08* (2006.01)
  *G03G 15/00* (2006.01)
  *H04N 1/00* (2006.01)

(52) U.S. Cl.
  CPC ..... *H04N 1/00068* (2013.01); *H04N 1/00074* (2013.01); *H04N 1/00082* (2013.01); *H04N 1/00204* (2013.01); *H04N 1/00408* (2013.01)

(56) References Cited

U.S. PATENT DOCUMENTS

| | | | |
|---|---|---|---|
| 7,430,379 B2 | 9/2008 | Lee | |
| 7,440,705 B2 | 10/2008 | Hatakeyama | |
| 9,298,156 B2 | 3/2016 | Fukuoka et al. | |
| 2004/0012645 A1* | 1/2004 | Kinalski | B41J 2/17553 347/7 |
| 2004/0032442 A1 | 2/2004 | Phillips | |
| 2004/0040614 A1 | 3/2004 | Sesek et al. | |
| 2004/0179049 A1* | 9/2004 | Phillips | B41J 2/17546 347/7 |
| 2004/0208655 A1* | 10/2004 | Ito | G03G 15/556 399/12 |
| 2005/0168548 A1* | 8/2005 | Phillips | B41J 2/17506 347/86 |
| 2005/0191085 A1* | 9/2005 | Grune | G03G 15/0882 399/258 |
| 2005/0191093 A1* | 9/2005 | Wachter | G03G 15/0877 399/258 |
| 2006/0083522 A1 | 4/2006 | Frankel et al. | |
| 2006/0114491 A1* | 6/2006 | Kim | G03G 15/556 358/1.14 |
| 2008/0122879 A1* | 5/2008 | Nicodem | B41J 2/17506 347/7 |
| 2011/0311243 A1* | 12/2011 | Kawai | G03G 15/556 399/28 |
| 2012/0213538 A1* | 8/2012 | Tomaru | G03G 15/502 399/27 |
| 2014/0079412 A1 | 3/2014 | Hymas et al. | |
| 2018/0032017 A1* | 2/2018 | Sakaguchi | G03G 15/5079 |

FOREIGN PATENT DOCUMENTS

| | | |
|---|---|---|
| JP | 2007-163942 A | 6/2007 |
| JP | 2010-282227 A | 12/2010 |
| KR | 10-2005-0073878 A | 7/2005 |
| KR | 10-2006-0042733 A | 5/2006 |
| KR | 10-2007-0024694 A | 3/2007 |

\* cited by examiner

FIG. 5

| REFILL CAPACITY OF TONER | COMPONENTS IN CARTRIDGE | | COMPONENT INDEPENDENTLY REPLACEABLE OF CARTRIDGE | |
|---|---|---|---|---|
| | FIRST COMPONENT (20K)/1unit | SECOND COMPONENT (25K)/1unit | THIRD COMPONENT (30K)/1unit | FOURTH COMPONENT (20K)/1unit |
| 5K/1unit | 4 | 5 | 6 | 4 |
| 2.5K/1unit | 8 | 10 | 12 | 10 |
| 1K/1unit | 20 | 25 | 30 | 20 |

510

| | COMPONENTS IN CARTRIDGE | | COMPONENT INDEPENDENTLY REPLACEABLE WITH CARTRIDGE | |
|---|---|---|---|---|
| | FIRST COMPONENT (20K)/1unit | SECOND COMPONENT (25K)/1unit | THIRD COMPONENT (30K)/1unit | FOURTH COMPONENT (20K)/1unit |
| REMAINING LIFESPAN OF COMPONENTS | 3K | 7K | 9K | 4K |

520

530

1. IT IS RECOMMENDED TO REFILL TONER WITH 5K CAPACITY

2. IT IS RECOMMENDED TO REFILL TONER IN ORDER OF 2K AND 1K

3. IT IS RECOMMENDED TO REFILL TONER IN ORDER OF 1K, 1K, AND 1K

IMAGE FORMING APPARATUS FOR GUIDING REFILLING OPERATION OF TONER

CROSS REFERENCE TO RELATED APPLICATIONS

This application is a continuation of U.S. National Stage Application under 35 U.S.C. 371 of International patent application Ser. No. 17/044,822, filed Apr. 19, 2019, which is a PCT National Phase of PCT International Application No. PCT/US2019/028348, filed on Apr. 19, 2019, which claims the priority benefit of Korean Patent Application No. 10-2018-0048674, filed on Apr. 26, 2018 in the Korean Intellectual Property Office, the entireties of which are incorporated by reference herein.

BACKGROUND

Generally, a copier or a laser printer performs copying or printing using a powdery toner in a cartridge. Since the cartridge in which the toner is contained is a consumable but relatively expensive, the cartridge is reused by refilling it with new toner.

BRIEF DESCRIPTION OF THE DRAWINGS

The above and other features of examples of the disclosure will be explained from the following description taken in conjunction with the accompanying drawings, in which:

FIG. 5 is a diagram for explaining a process of providing guide information for guiding a toner refilling operation based on a correlation between a replacement cycle of components consumed in an image forming apparatus and a toner refill cycle, according to an example;

DETAILED DESCRIPTION

An image forming apparatus described herein may be any type of apparatus capable of performing an image forming operation, such as a printer, a scanner, a fax machine, a multi-function printer (MFP), or a display apparatus. Print data, as disclosed herein, may refer to data transformed into a format capable of being printed by a printer. A scan file, as disclosed herein, may refer to a file obtained by scanning an image in a scanner.

Examples are described in detail herein with reference to the accompanying drawings so that the disclosure may be easily performed by one of ordinary skill in the art to which the disclosure pertain. The disclosure may, however, be embodied in many different forms and should not be construed as being limited to the examples set forth herein.

Figure 1:
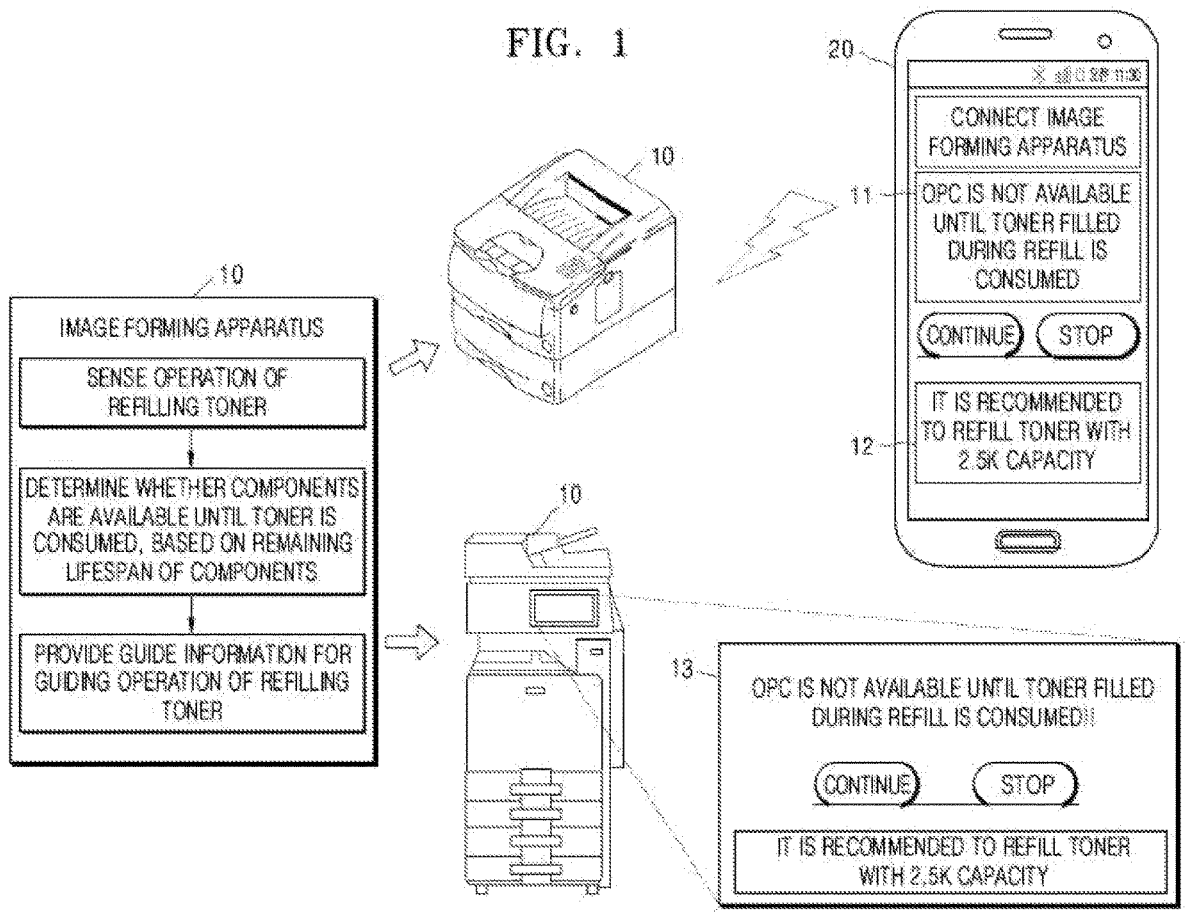
FIG. 1 is a diagram for explaining a method performed by an image forming apparatus to provide guide information for guiding a toner refilling operation according to the toner refilling operation, according to an example.

FIG. 1 is a diagram for explaining a method performed by an image forming apparatus 10 to providing guide information 13 for guiding a toner refilling operation according to the toner refilling operation, according to an example.

When the toner in a cartridge of the image forming apparatus 10 is consumed, the image forming apparatus 10 may display a message indicating that the toner in the cartridge is insufficient. In an example, the image forming apparatus 10 may display a message indicating that the toner needs to be refilled through a user interface apparatus in the image forming apparatus 10. In another example, the image forming apparatus 10 may output a light to a lamp in the image forming apparatus 10 to notify a user that the toner needs to be refilled.

The image forming apparatus 10 may detect whether an operation of refilling the toner in the cartridge is performed. In an example, the image forming apparatus 10 may detect a start of the operation of refilling the toner in the cartridge through a toner refill unit. In another example, the image forming apparatus 10 may receive an input indicating that the refilling operation of the toner has started through the user interface apparatus. The image forming apparatus 10 may calculate the remaining lifespan of components consumed through an image forming job in the image forming apparatus 10 when the refilling operation of the toner is detected. The image forming apparatus 10 may determine whether the components are available until the toner to be refilled is consumed before the toner is refilled in the cartridge. The image forming apparatus 10 may provide the guide information 13 for guiding the refilling operation of the toner based on a result of determination.

In example, as shown in FIG. 1, when the image forming apparatus 10 includes the user interface apparatus, the image forming apparatus 10 may display the guide information 13 through the user interface apparatus. The image forming apparatus 10 may display the guide information 13 including a message 11 "OPC is not available until the toner filled during the refill is consumed" and a message 12 "it is recommended to refill toner with 2·K capacity" through the user interface apparatus.

In another example, as shown in FIG. 1, when the image forming apparatus 10 does not have a user interface apparatus, the image forming apparatus 10 may transmit the guide information 13 to an external electronic apparatus 20. The external electronic apparatus 20 may display the guide information 13 for guiding the toner refilling operation. The external electronic apparatus 20 may display the guide information 13 including the message 11 "OPC is not available until the toner filled during the refill is consumed" and the message 12 "it is recommended to refill toner with 2·K capacity".

The image forming apparatus 10 may receive a user input after providing the guide information 13 and may continue or stop the refill operation according to the received input.

Figure 2:
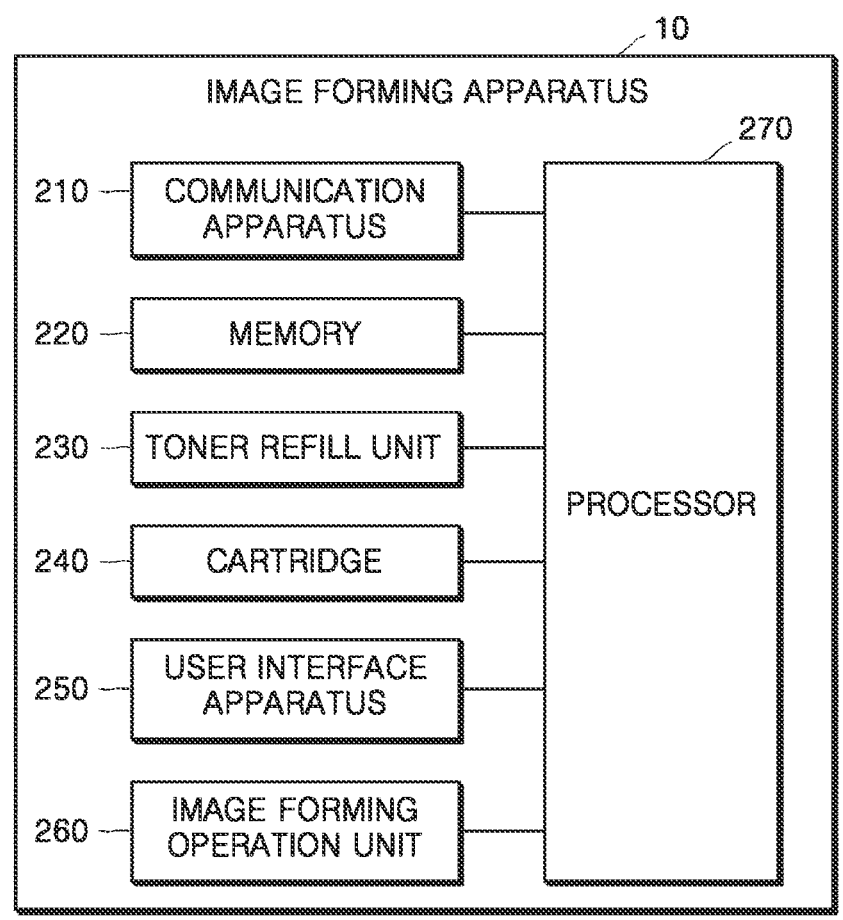
FIG. 2 is a block diagram showing a configuration of an image forming apparatus, according to an example.

FIG. 2 is a block diagram showing a configuration of the image forming apparatus 10, according to an example.

Referring to FIG. 2, the image forming apparatus 10 shown may include a communication apparatus 210, a memory 220, a toner refill unit 230, a cartridge 240, a user interface apparatus 250, an image forming operation unit 260, and a processor 270. However, all illustrated elements are not indispensable elements. The image forming apparatus 10 may be implemented by using more or less components than those illustrated in FIG. 2. Hereinafter, the elements shown in FIG. 2 will be described.

The communication apparatus 210 may perform communication with an external apparatus. Specifically, the communication apparatus 210 may be connected to a network by wired or wirelessly to perform communication with the external apparatus. In an example, the external apparatus may be a server managing the image forming apparatus 10 or an electronic apparatus of a user using the image forming apparatus 10. The communication apparatus 210 may include a communication module that supports one of a variety of wired and wireless communication methods. In an example, a communication module may be in the form of a chipset, or may be a sticker/barcode (e.g., a sticker including an NFC tag) including information necessary for communication, etc. The communication module may be a short-range communication module or a wired communication module.

The communication apparatus 210 may support at least one of a wireless LAN, a wireless fidelity (Wi-Fi), a Wi-Fi Direct, a Bluetooth, a Universal Serial Bus (USB), a Wired LAN, Near Field Communication (NFC), etc.

The communication apparatus 210 may be connected to an electronic apparatus located outside the image forming apparatus 10 to transmit and receive signals or data.

The memory 220 may store programs, data, or files related to the image forming apparatus 10. The processor 270 may execute the programs stored in the memory 220, read the data or the files stored in the memory 220, or store new files in the memory 220. The memory 220 may store program instructions, data files, data structures, etc., alone or in combination. The memory 220 may store instructions executable by the processor 270.

In an example, the memory 220 may store instructions for detecting an operation to refill a toner in the cartridge 240 of the image forming apparatus 10, instructions for calculating the remaining lifespan of at least one component consumable through use in the image forming apparatus 10, instructions for determining, based on the remaining lifespan of the at least one component, whether the at least one component is available to be consumed until consumption of an amount of the toner to be filled during the operation to refill, and instructions for displaying guide information to guide the operation to refill of the toner based on a result of determination.

In another example, the memory 220 may store instructions for calculating the remaining lifespan of at least one component consumable through use in the image forming apparatus 10 and the remaining amount of the toner in the cartridge 240 of the image forming apparatus 10, based on at least one of the remaining amount of the toner and the remaining lifespan of at least one component, instructions for determining whether to process with the refilling operation to refill the toner in the cartridge 240, and instructions for displaying the guide information to guide the refilling operation of the toner based on a result of determination.

The memory 220 may store data or information with respect to the number of refills according to the accumulated capacity of the toner and the refill capacity of the toner. Also, the memory 220 may store data or information with respect to the remaining amount of the toner and the remaining lifespan of the at least one component according to the image forming job.

The toner refill unit 230 may operate to refill the toner in the cartridge 240. In an example, the toner refill unit 230 may have a cover capable of receiving a toner reload kit (TRK) (not shown) from an outside of the image forming apparatus 10. Here, the TRK (not shown) may be a toner tank filled with a predetermined amount of toner. When the TRK (not shown) is received through the cover, the toner refill unit 230 may operate to refill the toner to the cartridge 240.

In an example, the toner refill unit 230 may detect an attempt to make a physical connection between the image forming apparatus 10 and the TRK (not shown) in the form of an electrical signal and regulate a subsequent operation to refill the toner or transmit an attempt to the processor 270. When the operation to refill the toner is started through the toner refill unit 230, the processor 270 may detect the operation to refill the toner. The image forming apparatus 10 may include a sensor (not shown). The sensor (not shown) may sense the operation to refill the toner performed by the toner refill unit 230. The sensor (not shown) may send sensed information of the refilling operation of the toner to the processor 270. Further, the sensor (not shown) may acquire refill capacity information regarding the toner. Also, the user interface apparatus 250 may receive the sensed information of the refilling operation of the toner and transmit the information to the processor 270.

In an example, an operation of the cover of the toner refill unit 230 may be controlled by the processor 270. When it is determined that the refill operation by the TRK (not shown) does not proceed, the cover of the toner refill unit 230 may operate in a lock state. On the other hand, when it is determined that the refill operation by the TRK (not shown) proceeds, the cover of the toner refill unit 230 may operate in an unlock state.

The user interface apparatus 250 may include an input unit for receiving an input for performing an image forming job from a user, etc., and an output unit for displaying information about a result of the image forming job or a state of the image forming apparatus 10, etc. In an example, the user interface apparatus 250 may include an operation panel for receiving a user input, a display panel for displaying a screen, and the like.

The input unit may include, in an example, devices capable of receiving various types of user input, such as a keyboard, a physical button, a touch screen, a camera or a microphone. Further, the output unit may include, in an example, a display panel or a speaker. However, the disclosure is not limited thereto, and the user interface apparatus 250 may include various devices supporting input/output.

The image forming operation unit 260 may include a printing unit, a scanning unit, and a facsimile unit. The image forming operation unit 260 may include some of these elements or may further include elements for performing other kinds of image forming jobs.

The printing unit may form an image on a recording medium by various printing methods such as an electrophotographic method, an inkjet method, a thermal transfer method, and a direct thermal method.

The scanning unit may irradiate light to a document receive the reflected light, and read an image recorded in the document. In an example, a CCD (Charge Coupled Device) or a CIS (contact type image sensor) may be employed as an image sensor reading the image from the document. The scanning unit may have a flatbed structure in which the document is placed at a fixed position and the image sensor reads the image while moving, a document feed structure in which the image sensor is positioned at a fixed position and the document is transported, or a complex structure of these.

A configuration for scanning the image of the facsimile unit may be shared with the scanning unit. A configuration for printing the received file may be shared with the printing unit. The facsimile unit may transmit a scan file to a destination or receive the scan file from the outside.

The processor 270 may control the overall operation of the image forming apparatus 10 and may include at least one processor such as a CPU or the like. The processor 270 may control other configurations included in the image forming apparatus 10 to perform an operation corresponding to the user input received through the user interface apparatus 250. The processor 270 may include at least one specialized processor corresponding to each function or may be an integrated processor.

The processor 270 may detect the operation to refill the toner into the cartridge 240. The processor 270 may calculate the remaining lifespan of at least one component consumable through use in the image forming apparatus 10 when the operation to refill of the toner is detected. The at least one component includes at least one cartridge component in the cartridge 240 and at least one independent component independently replaceable of the cartridge 240. The processor 270 may calculate the remaining lifespan of the at least one component based on a plurality of image forming jobs performed in the image forming apparatus 10 and a timing at which each of the at least one component is replaced. The remaining lifespan may be determined according to an estimated amount of the image forming job that may be performed by each of the at least one component, an estimated time at which each of the at least one component may be used. Also, the remaining lifespan may be expressed as a percentage of the calculated lifespan relative to the total lifespan of each of the at least one component with respect to each of the at least one component.

The processor 270 may calculate the remaining lifespan of the at least one component in the cartridge 240 consumable through the image forming job. The processor 270 may determine a timing to replace the cartridge 240 based on the remaining lifespan of the at least one cartridge component. In an example, the component in the cartridge 240 may be an Organic Photo Conductor (OPC) component or at least one roller component. Also, the processor 270 may calculate the remaining lifespan of the independent component in the image forming apparatus 10. In an example, the component that is independently replaceable with the cartridge 240 may be a waste toner box or a fuser. The processor 270 may store the remaining lifespan of the calculated at least one component in the memory 220. Also, the processor 270 may calculate a replacement cycle of the at least one component such that a replacement cycle of the at least one component in the cartridge 240 and a replacement cycle of the component independently replaceable with the cartridge 240 match, based on the remaining lifespan of the calculated at least one component.

Before the toner is refilled in the cartridge 240, the processor 270 may determine, based on the remaining lifespan of the at least one component, whether the at least one component are available until the toner filled through the refilling operation is consumed. By ensuring the use of the at least one component in the image forming apparatus 10 before the toner is refilled in the cartridge 240, the image forming apparatus 10 may prevent waste of the toner and efficiently use the at least one component.

Specifically, the processor 270 may acquire refill capacity information regarding the toner, and based on the refill capacity information, may calculate a correlation between the replacement cycle of the at least one component and a refill cycle of the toner based on the refill capacity information. In an example, the processor 270 may calculate a correlation indicating the number of refills according to the refill capacity of the toner with respect to each of the at least one component during use of each of the at least one component. The processor 270 may determine whether the at least one component is available to be consumed until the toner filled through the refilling operation is consumed, based on the remaining lifespan of the at least one component and the correlation. A method performed by the image forming apparatus 10 of determining whether the at least one component are available until the toner filled through the refilling operation is consumed will be described in detail with reference to FIG. 5.

The processor 270 may acquire the guide information to guide the refilling operation of the toner based on a result of determining whether the at least one component are available until the toner filled through the refilling operation is consumed. The processor 270 may display the guide information through the user interface apparatus 250. The guide information may be information providing a suitable determination of the refill capacity of the toner in consideration of the remaining lifespan of the at least one component in the image forming apparatus 10. In example, the guide information may be information to guide a toner refill capacity as it is, information to guide the replacement of a predetermined component, and information to guide toner refilling up to a different refill capacity.

In an example, the at least one component includes a first component. when a first replacement timing of when the first component becomes unavailable to be consumed based on the remaining lifespan of the first component before the amount of the toner filled through the refilling operation is consumed, the processor 270 may generate a message indicating that a new refilling operation become unavailable before the amount of the toner filled through the refilling operation is consumed. The processor 270 may display the generated message through the user interface apparatus 250. Also, the processor 270 may obtain first prediction information indicating the remaining lifespan of the first component when the toner filled through the refill operation is consumed. The processor 270 may display the first prediction information through the user interface apparatus 250. The processor 270 may obtain a first replacement scheduled timing of the first component from the first prediction information. The processor 270 may acquire first guide information to guide the refilling operation of the toner based on the remaining amount of the toner at the first replacement scheduled timing of the first component. The processor 270 may display the first guide information through the user interface apparatus 250.

In another example, the at least one component includes a first component. when a first replacement timing of when the first component becomes unavailable to be consumed based on the remaining lifespan of the first component before the amount of the toner refilled through the refilling operation is consumed, the processor 270 may acquire second guide information indicating the refill amount of the toner. The processor 270 may display the second guide information through the user interface apparatus 250.

In another example, when the remaining lifespan of each of at least two of the components among the at least one component becomes unavailable to be consumed before the amount of the toner refilled through the refilling operation is consumed, the processor 270 may acquire third guide information indicating a suggestion of stopping the refilling operation. The processor 270 may display the third guide information through the user interface apparatus 250.

In an example, the processor 270 may calculate the remaining amount of the toner and the remaining lifespan of the at least one component in real time or at predetermined time intervals when the toner and the at least one component are consumed through the image forming job. The processor 270 may update the remaining amount of the toner stored in the memory 220 and the remaining lifespan of the at least one component based on a result of calculation. The processor 270 update replacement cycles of the at least one component and a refill cycle of the toner based on the remaining amount of the toner and the remaining lifespan of the at least one component that are calculated. Also, the processor 270 may store in the memory 220 the cumulative refill capacity of the toner and the number of refills according to the refill capacity of the toner. When the amount of the toner filled through the refilling operation is wholly consumed, the processor 270 may calculate the capacity of the toner to be refilled again to the cartridge 240 based on the remaining lifespan of the at least one component. The processor 270 may display the capacity information of the toner to be refilled through the user interface apparatus 250. When the remaining amount of the toner is less than a predetermined amount before the toner filled through the refilling operation is consumed, the processor 270 may display the capacity information of the toner to be refilled again through the user interface apparatus 250 based on the remaining lifespan of the at least one component. In an example, the processor 270 may display, through the user interface apparatus 250, a message recommending the capacity information of the toner when the remaining amount of the toner is 50%, 25%, 10%, and 5%.

The processor 270 may transmit the guide information to guide the refilling operation of the toner through the communication apparatus 210 to the server managing the image forming apparatus 10 and the electronic apparatus of the user using the image forming apparatus 10. Further, the processor 270 may transmit a web page or an application providing a service of the image forming apparatus 10 through the communication apparatus 210.

That is, the image forming apparatus 10 may determine whether the lifespan of the at least one component in the image forming apparatus 10 is guaranteed until the toner is consumed after the refill of the toner and provide information to guide the refill capacity of the toner or the replacement of the at least one component according to a result of determination, thereby preventing the toner from being wasted and efficiently using the at least one component.

Also, the processor 270 may calculate the remaining lifespan of the at least one component consumed through the image forming job. Also, the processor 270 may calculate the remaining amount of toner in the cartridge 240.

The processor 270 may determine whether to proceed with the refill operation to refill the toner to the cartridge 240 based on at least one of the remaining lifespan of the at least one component. Specifically, the processor 270 may determine whether the refill operation is possible by a TRK (not shown) in which a predetermined amount of toner is filled, based on the remaining amount of toner in the cartridge 240 and a first remaining lifespan of a first component among the at least one component. The processor 270 may control an operation of a cover of the toner refill unit 230 based on a result of determining whether to proceed with the refill operation.

For example, when a first image forming workload that may be performed according to the first remaining lifespan of a first component is smaller than a second image forming workload that may be performed according to an amount of toner supplied from the TRK (not shown), the processor 270 may determine not to proceed with the refill operation and control the operation of the cover such that the cover of the toner refill unit 230 operates in a lock state.

In another example, when the remaining amount of toner remaining in the cartridge 240 exceeds a reference toner amount, the processor 270 may determine not to proceed with the refill operation and control the operation of the cover such that the cover of the toner refill unit 230 operates in the lock state. For example, the reference toner amount may be a toner amount obtained by subtracting a toner amount charged in the TRK (not shown) from a maximum supply toner amount of the cartridge 240.

In another example, when the first image forming workload that may be performed according to the first remaining lifespan of the first component exceeds the second image forming workload that may be performed according to the amount of toner supplied from the TRK (not shown), the processor 270 may determine to proceed with the refill operation and control the operation of the cover such that the cover of the toner refill unit 230 operates in an unlock state.

The processor 270 may control the user interface apparatus 250 to display guide information to guide the refilling operation of the toner. For example, the processor 270 may determine information about the number of times refillable by the TRK (not shown) based on the remaining amount of toner in the cartridge 240 and the amount of toner charged in the TRK (not shown). For example, when the remaining amount of toner is 30% of the maximum supply toner amount and the amount of toner charged in the TRK (not shown) is 50% of the maximum supply toner amount, the processor 270 may determine the number of times that the toner may be refilled by the TRK (not shown) as one time. The user interface apparatus 250 may display the information about the refillable number of times.

Hereinafter, various operations performed by the image forming apparatus 10 or applications thereof will be described. Although any of the communication apparatus 210, the memory 220, the toner refill unit 230, the cartridge 240, the user interface apparatus 250, the image forming operation unit 260, and the processor 270 of the image forming apparatus 10 is not specified, the description that may be clearly understood and predicted by one of ordinary skill in the art of the disclosure may be understood through a normal implementation, and the scope of the disclosure is limited by the name of a particular configuration or by a physical/logical structure.

Figure 3:
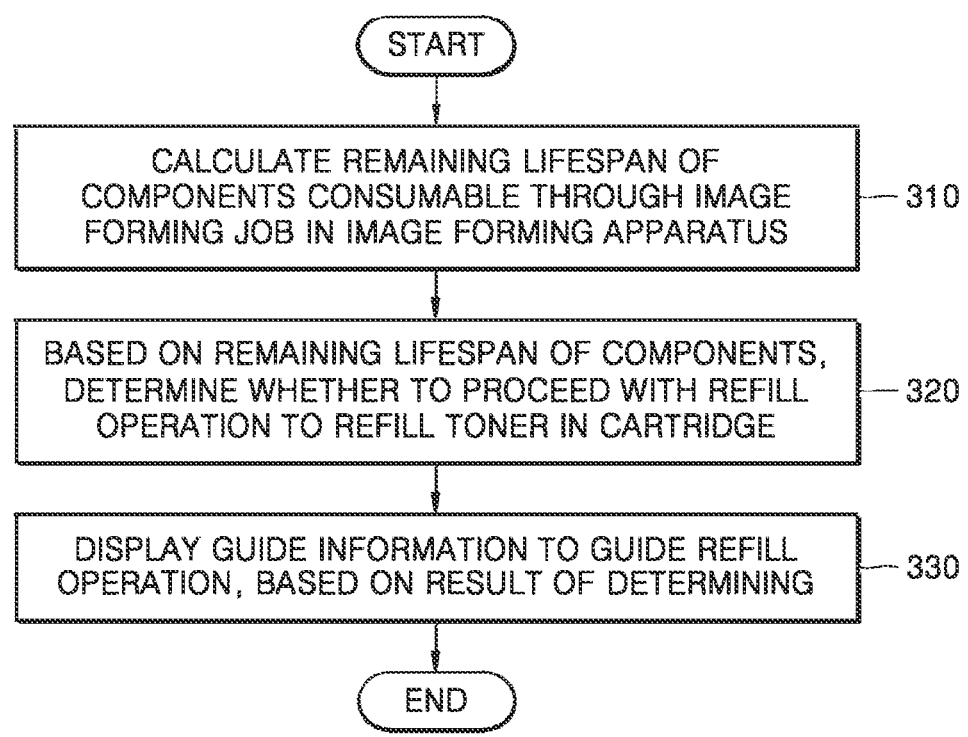
FIG. 3 is a flowchart showing a method of operating an image forming apparatus to guide a toner refilling operation, according to an example.

FIG. 3 is a flowchart showing a method of operating the image forming apparatus 10 to guide a toner refilling operation, according to an example In block 310, the image forming apparatus 10 may calculate a remaining lifespan of components consumable through an image forming job in the image forming apparatus 10. Further, the image forming apparatus 10 may calculate the remaining amount of toner in a cartridge of the image forming apparatus 10. Here, the remaining lifespan of components or the remaining amount of the toner may be calculated according to a predetermined cycle. Further, when a preparation operation for starting a refill operation is detected in the image forming apparatus 10, the remaining lifespan of components or the remaining amount of the toner may be calculated.

For example, the image forming apparatus 10 may calculate the remaining lifespan of components based on a plurality of image forming jobs performed in the image forming apparatus 10 and a time at which each of the components is replaced. Further, the image forming apparatus 10 may calculate the remaining amount of toner based on a result of cumulative calculation of pixels performed in the plurality of image forming jobs.

In an example, the image forming apparatus 10 may calculate the remaining lifespan of a component in the cartridge consumed through the image forming job to determine the replacement timing of the cartridge. Further, the image forming apparatus 10 may calculate the remaining lifespan of the component in the image forming apparatus 10 that is independently replaceable with the cartridge.

In block 320, the image forming apparatus 10 may determine, based on the remaining lifespan of the components, whether to proceed with the refill operation to refill the toner in the cartridge.

In an example, the image forming apparatus 10 may sense a preparation operation for starting the refill operation. The image forming apparatus 10 may sense a physical connection attempt of a TRK through a toner refill unit. The image forming apparatus 10 may obtain refill capacity information of the toner to be refilled in the cartridge. Here, the refill capacity information is toner capacity information with respect to the toner charged in the TRK. For example, the toner capacity information may be classified into a 5K capacity capable of performing approximately 5,000 image forming jobs, a 2.5K capacity capable of performing approximately 2,500 image forming jobs, and a 1K capacity capable of performing approximately 1,000 image forming jobs. The image forming apparatus 10 may calculate a correlation between a replacement cycle of the components and a refilling cycle of the toner based on the refill capacity information of the toner. The image forming apparatus 10 may determine whether the component are available until the toner filled through the refilling operation is consumed, based on the remaining lifespan of the components and the correlation, thereby determining whether to proceed with the refill operation.

In another example, the image forming apparatus 10 may determine whether the refill operation is possible by the TRK in which a predetermined amount of toner is filled, based on the remaining amount of toner in the cartridge and a first remaining lifespan of a first component. The image forming apparatus 10 may control an operation of a cover of the toner refill unit based on a result of determining whether to proceed with the refill operation.

In block 330, the image forming apparatus 10 may display guide information to guide the refilling operation of the toner, based on the result of determining whether to proceed with the refill operation to refill the toner.

For example, when a first replacement timing based on a remaining lifespan of a first component among the components is before the timing at which the toner filled through the refilling operation is consumed, the image forming apparatus 10 may display a message indicating that the first component is not available until the toner filled through the refilling operation is consumed. The image forming apparatus 10 may acquire first prediction information indicating the remaining lifespan of the first component when the toner filled through the refilling operation is consumed and may display the first prediction information. The image forming apparatus 10 may display first guide information to guide the refilling operation of the toner based on a remaining amount of the toner at a first replacement scheduled timing of the first component from the first prediction information.

Further, when the first replacement timing based on the remaining lifespan of the first component among the components is before the timing at which the toner filled through the refilling operation is consumed, the image forming apparatus 10, based on the remaining lifespan of the first component, may display second guide information for recommending a refill capacity of the toner.

Further, when a replacement timing based on the remaining lifespan of each of at least two of the components is before the timing at which the toner filled through the refilling operation is consumed, the image forming apparatus 10 may display third guide information for recommending stopping the refilling operation.

Meanwhile, the image forming apparatus 10 may calculate the remaining amount of the toner and the remaining lifespan of the components when the toner and the components are consumed through the image forming job, thereby updating the replacement cycle of the components and the refill cycle of the toner. The image forming apparatus 10 may display information for recommending the capacity of the toner to be refilled by calculating the capacity of the toner to be refilled again to the cartridge based on the remaining lifespan of the components when the toner is wholly consumed.

The image forming apparatus 10 may also transmit guide information to guide the refilling operation of the toner to a server managing the image forming apparatus 10 and the external electronic apparatus 20 of a user using the image forming apparatus 10.

The image forming apparatus 10 may also display a result of determining whether the refill operation may be possible by the TRK charged with a predetermined amount of toner and control the operation of the cover of the toner refill unit based on a result of determining whether to proceed with the refill operation.

In an example, when a first image forming workload that may be performed according to a first remaining lifespan of a first component is smaller than a second image forming workload that may be performed according to a toner amount supplied from the TRK, the image forming apparatus 10 may display a result of determining not to proceed with the refill operation and to control the operation of the cover such that the cover of the toner refill unit operates in a lock state.

In another example, when the remaining amount of toner remaining in the cartridge exceeds a reference toner amount, the image forming apparatus 10 may display the result of determining not to proceed with the refill operation and to control the operation of the cover such that the cover of the toner refill unit operates in the lock state.

In another example, when the first image forming workload that may be performed according to the first remaining lifespan of the first component exceeds the second image forming workload that may be performed according to the toner amount supplied from the TRK, the image forming apparatus 10 may display a result of determining to proceed with the refill operation and to control the operation of the cover such that the cover of the toner refill unit operates in an unlock state.

Figure 4:
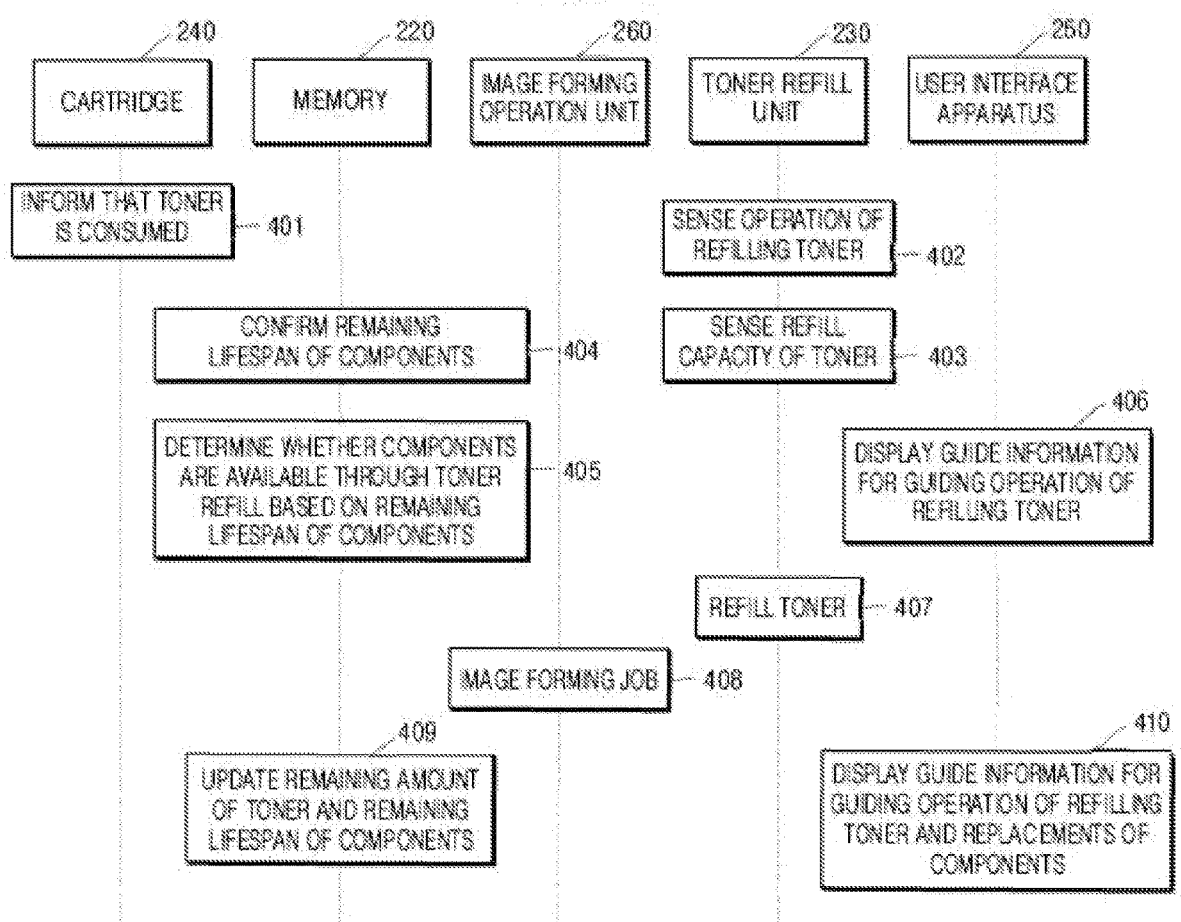
FIG. 4 is a diagram for explaining a method of operating configurations in an image forming apparatus for guiding a toner refilling operation, according to an example.

FIG. 4 is a diagram for explaining a method of operating configurations in the image forming apparatus 10 that guides a refilling operation of a toner, according to an example.

In block 401, the cartridge 240 may detect that the toner in the cartridge 240 has been consumed and transmit a message informing that the toner has been consumed to the processor 270. The processor 270 may display a message through the user interface apparatus 250 informing that the toner needs to be refilled.

In block 402, the processor 270 may detect the operation of refilling the toner in the cartridge 240 through the toner refill unit 230. In an example, the image forming apparatus 10 may include a sensor to detect the refilling operation of the toner. In an example, the toner refill unit 230 may detect an attempt to make a physical connection between the image forming apparatus 10 and a refill toner bottle (not shown) in the form of an electrical signal and regulate a subsequent operation of refilling the toner or transmit an attempt to refill the toner to the processor 270. In block 403, the processor 270 may detect the refill capacity of the toner refilled through the toner refill unit 230.

In block 404, the processor 270 may determine the remaining lifespan of components through remaining lifespan data of the components stored in the memory 220. In block 405, the processor 270 may determine, based on the remaining lifespan of the components, whether the components are available until the toner filled through the refilling operation is consumed.

In block 406, the processor 270 may display guide information for guiding the refilling operation of the toner through the user interface apparatus 250.

In block 407, the toner refill unit 230 may refill the toner in the cartridge 240.

In block 408, the image forming operation unit 260 may perform an image forming job requested by the image forming apparatus 10.

In block 409, the processor 270 may calculate a remaining amount of the toner consumed through the image forming job and the remaining lifespan of the components, and update the remaining amount of the toner stored in the memory 220 and the remaining lifespan of the components.

In block 410, the processor 270 may display guide information informing the refilling operation of the toner and the replacement of the components through the user interface apparatus 250.

FIG. 5 is a diagram for explaining a process of providing guide information for guiding a refilling operation of a toner based on a correlation between a replacement cycle of components consumed in the image forming apparatus 10 and a refill cycle of the toner according to an example.

The image forming apparatus 10 may store information relating to the replacement cycle of the components in the image forming apparatus 10 and the refill cycle of the toner. The image forming apparatus 10 may calculate a correlation between the replacement cycle of each of the components in a cartridge and each of the components independently replaceable with the cartridge and the refill cycle of the toner. Here, the replacement cycle of the components and the refill cycle of the toner may be determined based on the number of printed sheets which may be a basis of an image forming job.

In an example, as shown in FIG. 5, a first component may be replaced every time when an image forming job of approximately 20,000 sheets is performed, and a second component may be replaced every time an image forming job of approximately 25,000 sheets is performed. Further, a third component may be replaced every time when an image forming job of approximately 30,000 sheets is performed. A fourth component may be replaced every time when an image forming job of approximately 20,000 sheets is performed. Also, the refill capacity of the toner may be divided into 5K capacity for performing an image forming job of approximately 5,000 sheets, 2.5K capacity for performing an image forming job of approximately 2,500 sheets, and 1K capacity for performing an image forming job of approximately 1,000 sheets. The image forming apparatus 10 may calculate and store the number of refills according to the refill capacity of the toner while each of the components is used with respect to each of the components. The image forming apparatus 10 may generate correlation information 510 indicating the number of replacements of the components according to the refill capacity of the toner based on a result of calculation. The image forming apparatus 10 may store the correlation information 510 in a memory.

That is, the image forming apparatus 10 may calculate the correlation between the replacement cycle of the components and the refill cycle of the toner, based on the refill capacity information of the toner. In an example, the first component may be replaced every time when the image forming job of approximately 20,000 sheets is performed, and the 5K capacity of the toner may be consumed through the image forming job of approximately 20,000 sheets. The image forming apparatus 10 may acquire and store information for refilling the 5K capacity of the toner four times while the first component is used.

Meanwhile, the image forming apparatus 10 may detect the operation of refilling the toner in the cartridge. The image forming apparatus 10 may acquire the refill capacity information of the toner refilled in the cartridge. When the refilling operation of the toner is detected, the image forming apparatus 10 may calculate the remaining lifespan of the components in the image forming apparatus 10. In an example, the image forming apparatus 10 may determine, based on a usage record and a state of each component in the image forming apparatus 10, that the first component has the lifespan for performing the image forming job of approximately 3,000 sheets, the second component has the lifespan for performing the image forming job of approximately 7,000 sheets, the third component has the lifespan for performing the image forming job of 9,000 sheets, and the fourth component may have the lifespan for performing the image forming job of approximately 4,000 sheets. The image forming apparatus 10 may acquire and store remaining lifespan information 520 of each component in the memory.

The image forming apparatus 10 may determine whether the components are available until the toner filled through the refilling operation is consumed, based on the remaining lifespan information 520 of the components and the correlation information 510 indicating the number of replacements of the components according to the refill capacity of the toner. The image forming apparatus 10 may display the guide information 530 guiding the refilling operation of the toner based on a result of determination. In an example, when the refill capacity of the toner detected by the image forming apparatus 10 is 5K capacity, the remaining lifespan of the first component is consumed before the 5K capacity is consumed. In this case, the image forming apparatus 10 may display information for recommending the refill capacity of the toner as 2.5K capacity or 1K capacity. The image forming apparatus 10 may also display recommendation information for refilling the refill amount of the toner in the order of 2.5K capacity and 1K capacity or recommendation information for refilling the refill amount of the toner in the order of 1K capacity, 1K capacity, and 1K capacity, based on the remaining lifespan of the first component to the fourth component. Further, the image forming apparatus 10 may display information for maintaining the refill capacity of the toner as 5K capacity based on the remaining lifespan of the second component to the fourth component. Further, the image forming apparatus 10 may display a plurality of recommendation information with respect to the refilling operation of the toner.

Figure 6:
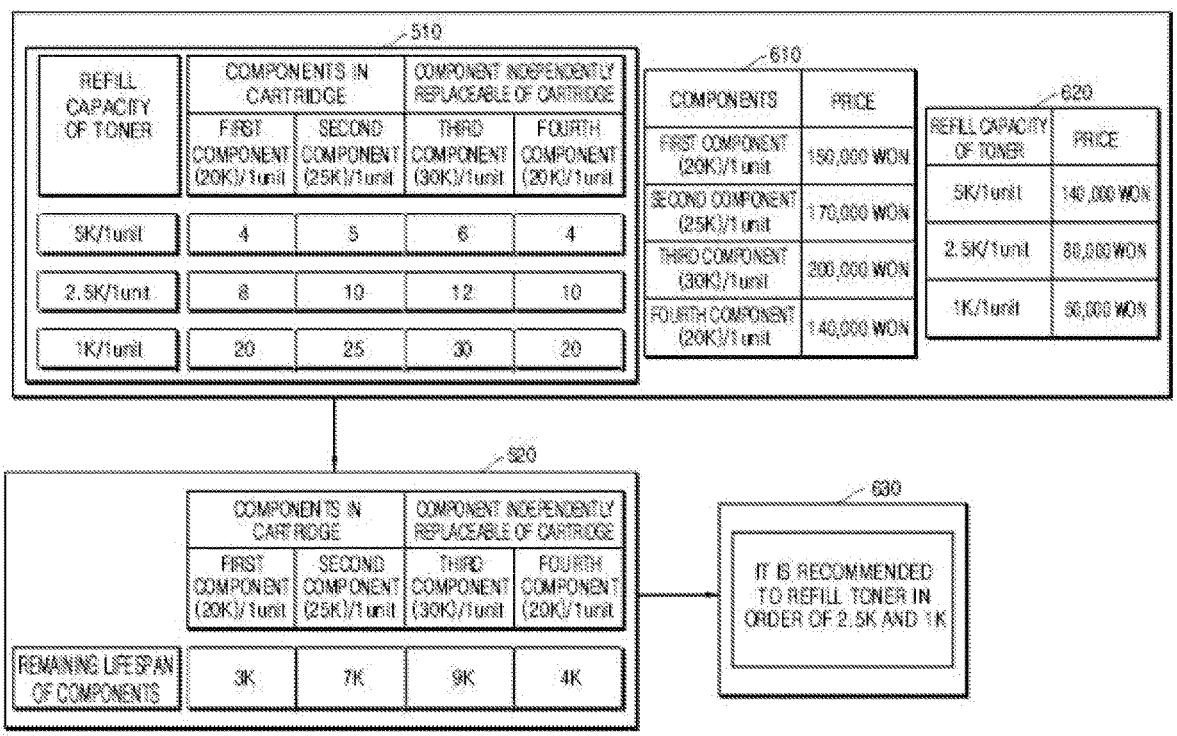
FIG. 6 is a diagram for explaining a process of providing guide information for guiding a toner refilling operation based on price information of components in an image forming apparatus and toner price information according to a refill capacity, according to an example.

FIG. 6 is a diagram for explaining a process of providing guide information for guiding a refilling operation of a toner based on price information 610 of components in the image forming apparatus 10 and toner price information 620 according to a refill capacity, according to an example.

The image forming apparatus 10 may generate the guide information for guiding the refilling operation of the toner in consideration of prices of components in the image forming apparatus 10 and a price of the toner according to the refill capacity. The correlation information 510 indicating the number of replacements of the components according to the refill capacity of the toner described in FIG. 5 and the remaining lifespan information 520 of the components are redundant with those described in FIG. 6, and thus redundant descriptions will be omitted.

The image forming apparatus 10 may receive the price information 610 of components in the image forming apparatus 10 and the toner price information 620 according to the refill capacity through the user interface apparatus 250 or from an external device through a communication apparatus. The image forming apparatus 10 may store the price information 610 of components in the image forming apparatus 10 and the toner price information 620 according to the refill capacity in a memory.

Meanwhile, the image forming apparatus 10 may generate the guide information for guiding the refilling operation of the toner suitable for a current state of the image forming apparatus 10 in consideration of the remaining lifespan and prices of the components and the refill capacity and price of the toner. In an example, based on the remaining lifespan information 520 of the components, the image forming apparatus 10 may generate first guide information for refilling the refill capacity of the toner in the capacity of 5K, second guide information for refilling the refill capacity of the toner in the order of the capacity of 2.5K and the capacity of 1K, and third guide information for refilling the refill capacity of the toner in the order of the capacity of 1K, the capacity of 1K, and the capacity of 1K.

The image forming apparatus 10 may compare costs incurred between the generated first guide information and third guide information to determine the guide information for guiding the refilling operation of the toner suitable for the current state of the image forming apparatus 10. When the toner is refilled with the capacity of 5K according to the first guide information, an image forming job of approximately 3000 sheets is performed according to the remaining lifespan of the first component, and the cost is 140,000 won according to the price information 620. When the toner is refilled in the order of the capacity of 2.5K and the capacity of 1K according to the second guide information, an image forming job of approximately 3,000 sheets is performed according to the remaining lifespan of the first component, and the cost is 130,000 won according to the price information 620. Further, when the toner is refilled in the order of the capacity of 1K, the capacity of 1K, and the capacity of 1K according to the third guide information, an image forming job of approximately 3000 sheets is performed according to the remaining lifespan of the first component, and the cost is 150,000 won. Therefore, the image forming apparatus 10 may determine the second guide information for refilling the refill capacity of the toner in the order of the capacity of 2.5K and the capacity of 1K as the guide information suitable for the current state of the image forming apparatus 10.

In FIG. 6, referring to an image 630 displayed through the user interface apparatus 250 of the image forming apparatus 10, the image forming apparatus 10 may display refills the second guide information for refilling the refill capacity of the toner in the order of the capacity of 2.5K and the capacity of 1K.

Figure 7:
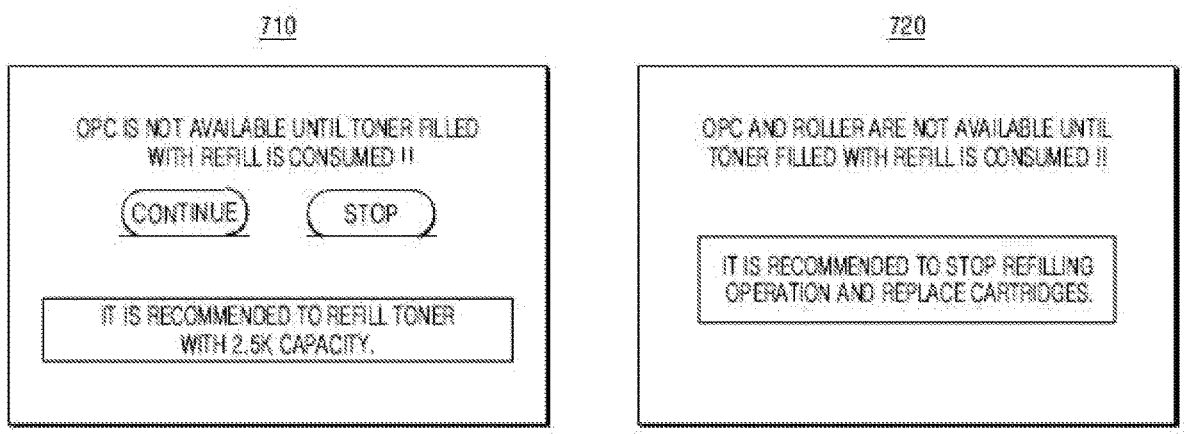
FIG. 7 is a diagram for explaining a process performed by an image forming apparatus to provide guide information for guiding a toner refilling operation, according to an example.

FIG. 7 is a diagram for explaining a process performed by the image forming apparatus 10 of providing guide information for guiding a refilling operation of a toner, according to an example.

When a first replacement timing based on the remaining lifespan of a first component among components is before a timing at which the toner filled through the refilling operation is consumed, the image forming apparatus 10 may acquire guide information for recommending the refill capacity of the toner, based on the remaining lifespan of the first component. The image forming apparatus 10 may display the guide information for recommending the refill capacity of the toner through the user interface apparatus 250.

Referring to an image 710 displayed through the user interface apparatus 250 of the image forming apparatus 10 in FIG. 7, the image forming apparatus 10 may determine, based on the remaining lifespan of the components in the image forming apparatus 10, that it is impossible to perform an image forming job since an OPC component is consumed before the refill capacity of the toner detected through the refilling operation is wholly consumed. The image forming apparatus 10 may display through the user interface apparatus 250 a message "OPC is not available until the toner filled with the refill is consumed". Also, the image forming apparatus 10 may display an icon for selecting whether to continue or stop the refilling operation of the toner detected through a current refilling operation. Further, the image forming apparatus 10 may display information for recommending a refillable refill capacity in place of the refill capacity of the toner detected through the current refill operation. In this case, the image forming apparatus 10 may acquire the information for recommending the refillable refill capacity based on the remaining lifespan of the OPC component.

In an example, the refill capacity of the toner detected through the current refill operation is a capacity capable of performing an image forming job of approximately 5000 pages. However, the remaining lifespan of the current OPC component is consumed when an image forming job of approximately 2,700 pages is performed. In this case, the image forming apparatus 10 may generate information for recommending a refill capacity capable of performing an image forming job of approximately 2,500 pages. The image forming apparatus 10 may display a message "It is recommended to refill toner with a capacity of 2.5K" through the user interface apparatus 250.

Meanwhile, when a replacement timing based on the remaining lifespan of each of at least two of the components is before the timing at which the toner refilled through the refilling operation is consumed, the image forming apparatus 10 may display guide information for recommending stopping the refilling operation through the user interface apparatus 250.

In FIG. 7, referring to an image 720 displayed through the user interface apparatus 250 of the image forming apparatus 10, the image forming apparatus 10 may determine that it is impossible to perform the image forming job since the OPC component and a roller component are consumed before the toner refilled through the refilling operation is wholly consumed, based on the remaining lifespan of the components in the image forming apparatus 10. The image forming apparatus 10 may display through the user interface apparatus 250 a message "OPC and roller are not available until the toner filled with the refill is consumed". Further, the image forming apparatus 10 may display guide information for recommending stopping the current refilling operation through the user interface apparatus 250.

In an example, the refill capacity of the toner detected through the current refill operation is a capacity capable of performing an image forming job of approximately 2500 pages. However, the remaining lifespan of the current OPC component is consumed when an image forming job of approximately 200 pages is performed, and the remaining lifespan of the current roller is consumed when an image forming job of approximately 150 pages is performed. In this case, the image forming apparatus 10 may display a message "It is recommended to stop the refilling operation and replace the cartridge" through the user interface apparatus 250.

Figure 8:
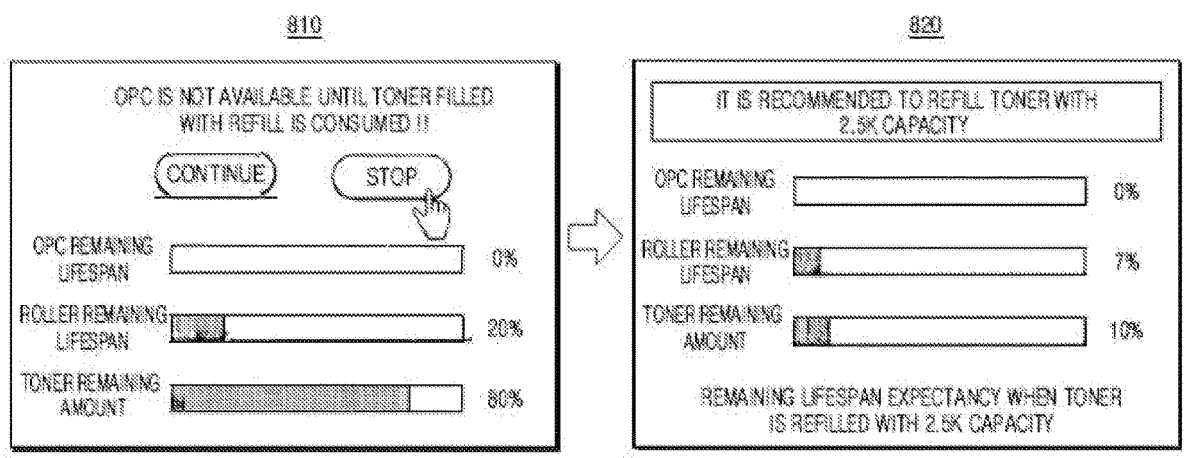
FIG. 8 is a diagram for explaining a process performed by an image forming apparatus to provide guide information for recommending a toner refill capacity based on the remaining lifespan of components, according to another example.

FIG. 8 is a diagram for explaining a process performed by the image forming apparatus 10 of providing guide information for recommending refill capacity of a toner based on the remaining lifespan of components, according to another example.

The image forming apparatus 10 may calculate a correlation between the replacement cycle of the components and the refilling cycle of the toner based on refill capacity information of the toner. The image forming apparatus 10 may determine whether the components are available until the toner filled through a refilling operation is consumed, based on the remaining lifespan of the components and the correlation.

When a first replacement timing based on the remaining lifespan of a first component of the components is before a timing at which the toner filled through the refilling operation is consumed, the image forming apparatus 10 may display a message informing that the first component is not available until the toner filled through the refilling operation is consumed. The image forming apparatus 10 may obtain first prediction information indicating the remaining lifespan of the first component when the toner filled through the refilling operation is consumed. Further, the image forming apparatus 10 may acquire a first replacement scheduled timing of the first component from the first prediction information. The image forming apparatus 10 may acquire first guide information for guiding the refilling operation of the toner based on a remaining amount of the toner at the first replacement scheduled timing of the first component. The image forming apparatus 10 may display the first prediction information and the first guide information through the user interface apparatus 250.

Referring to an image 810 displayed through the user interface apparatus 250 of the image forming apparatus 10 in FIG. 8, the image forming apparatus 10 may determine, based on the remaining lifespan of the components in the image forming apparatus 10, that it is impossible to perform an image forming job since an OPC component is consumed before the refill capacity of the toner detected through the refilling operation is wholly consumed. In this case, the image forming apparatus 10 may display through the user interface apparatus 250 a message "OPC is not available until the toner filled with the refill is consumed".

The image forming apparatus 10 may obtain prediction information indicating the remaining lifespan of the components in the image forming apparatus 10 when the toner to be refilled through a current refilling operation is consumed. In an example, the image forming apparatus 10 may display the remaining lifespan of the OPC component and the remaining lifespan of a roller when the toner to be refilled through a current refilling operation is consumed. The image forming apparatus 10 may calculate a scheduled replacement timing of each component based on the remaining lifespan of the OPC component and the remaining lifespan of the roller. The image forming apparatus 10 may acquire first guide information for guiding the refilling operation of the toner based on a remaining amount of the toner at an early scheduled replacement timing among respective scheduled replacement timings of the components. When the remaining amount of the toner is 30% or more at the early scheduled replacement timing, the image forming apparatus 10 may display a message for recommending stopping the refilling operation of the toner. Meanwhile, when the remaining amount of the toner is 30% or less at the early scheduled replacement timing, the image forming apparatus 10 may display a message for requesting continuing the refilling operation of the toner. Referring to the image 810 in FIG. 8, since the remaining amount of the toner is 80% or more at the time when the remaining lifespan of the OPC component is consumed, the image forming apparatus 10 may display a message for recommending stopping the refilling operation of the toner refilled to a current cartridge. The image forming apparatus 10 may calculate a refill capacity capable of consuming the toner in accordance with the time when the remaining lifespan of the OPC component is consumed and display a message for recommending refill capacity information.

Also, the image forming apparatus 10 may display an icon for selecting whether to continue or stop the refilling operation of the toner detected through the current refilling operation. In an example, the image forming apparatus 10 may receive an input for selecting the icon to stop the current refilling operation of the toner. Then, the image forming apparatus 10 may acquire first guide information for guiding the determined refilling operation of the toner based on the lifespan of the components.

Referring to an image 820 displayed through the user interface apparatus 250 of the image forming apparatus 10 in FIG. 8, the image forming apparatus 10 may display the first guide information for guiding the refilling operation of the toner through the user interface apparatus 250. In an example, the image forming apparatus 10 may calculate the refill capacity of the toner based on the remaining lifespan of the OPC component that is earlier consumed between the remaining lifespan of the OPC component and the remaining lifespan of the roller. The image forming apparatus 10 may display a message for recommending the calculated refill capacity of the toner. Further, the image forming apparatus 10 may display remaining lifespan expectancy indicating the remaining lifespan of each component and the remaining amount of the toner when using the recommended refill capacity of the toner.

Figure 9:
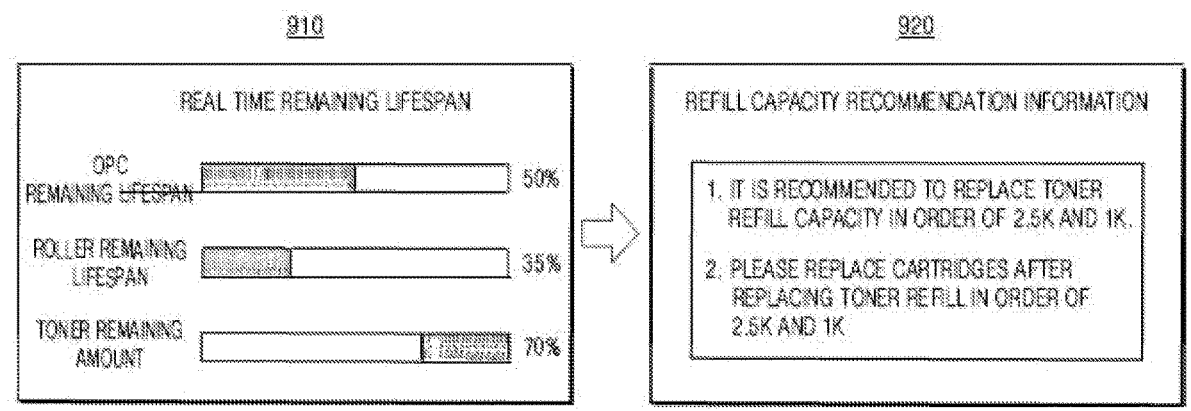
FIG. 9 is a diagram for explaining a process performed by an image forming apparatus to update a remaining lifespan of a component in real time and providing guide information for recommending a toner refill capacity, according to another example.

FIG. 9 is a diagram for explaining a process performed by the image forming apparatus 10 of updating remaining lifespan of a component in real time and providing guide information for recommending refill capacity of a toner, according to another example.

The image forming apparatus 10 may calculate a remaining amount of the toner and the remaining lifespan of the components when the toner and the components are consumed through an image forming operation to update replacement cycle of the components and refill cycle of the toner.

Referring to an image 910 displayed through the user interface apparatus 250 of the image forming apparatus 10 in FIG. 9, when predetermined image forming jobs are performed, the image forming apparatus 10 may calculate a remaining amount of the toner and the remaining lifespan of the components in real time. The image forming apparatus 10 may update the remaining amount of the toner and the remaining lifespan of the components that are stored in a memory based on a result of calculation. Although FIG. 9 shows that the remaining lifespan is updated in real time, the remaining lifespan may be updated at a predetermined time interval.

In an example, the image forming apparatus 10 may calculate remaining lifespan of an OPC component and remaining lifespan of a roller that are consumed through a predetermined image forming job. As shown in the image 910 in FIG. 9, the image forming apparatus 10 may display the remaining lifespan of the OPC component, the remaining lifespan of the roller, and the remaining amount of the toner in the form of a bar graph expressed in a percentage.

Referring to an image 920 displayed through the user interface apparatus 250 of the image forming apparatus 10 in FIG. 9, when the toner is wholly consumed, the image forming apparatus 10 may calculate a capacity of the toner to be refilled to a cartridge again, based on the remaining lifespan of the components, and display information for recommending the capacity of the toner to be refilled.

In an example, the image forming apparatus 10 may provide an order of toner refill capacity, and may also provide replacement timing of the cartridge. As shown in the image 920 in FIG. 9, the image forming apparatus 10 may display a message for recommending refilling the toner refill capacity in the order of 2.5K to 1K. Further, the image forming apparatus 10 may display a message for replacing the cartridge after refilling the toner refill capacity in the order of 2.5K to 1K.

Figure 10:
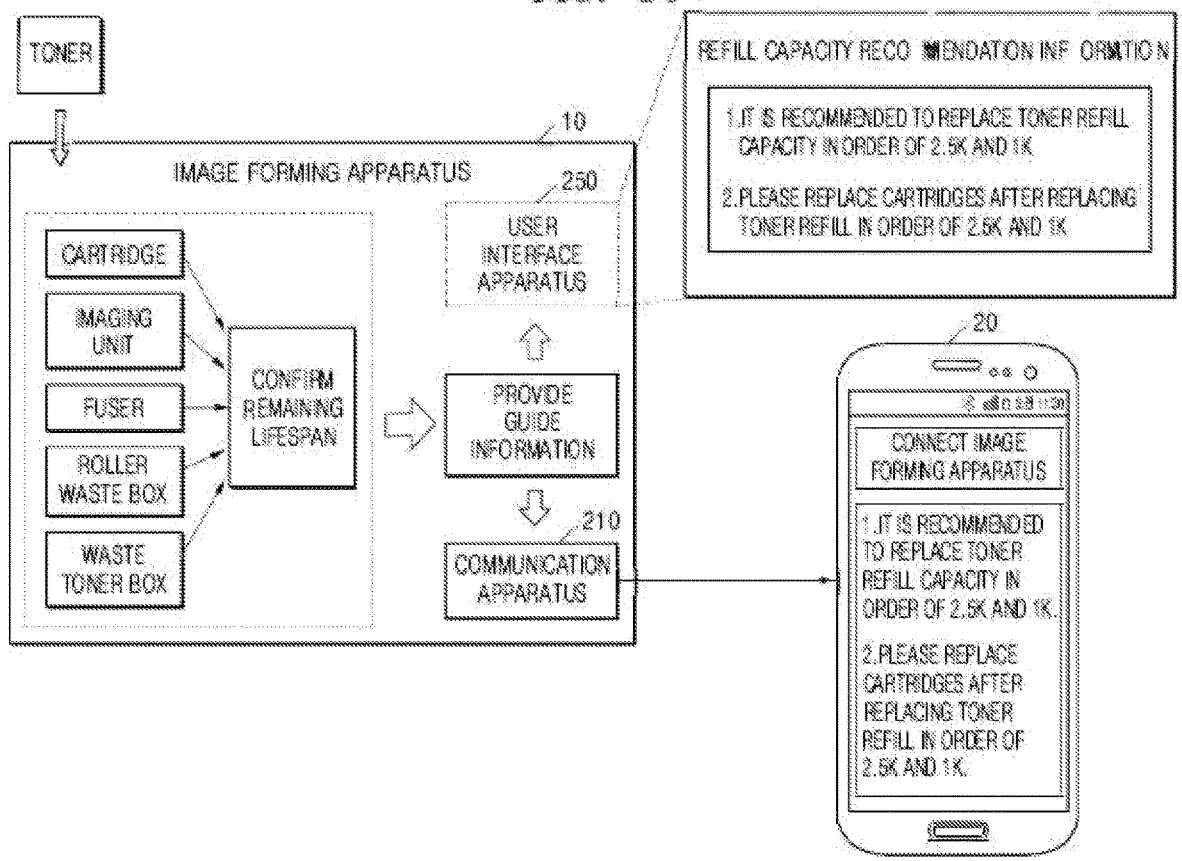
FIG. 10 is a diagram for explaining a process of providing guide information obtained based on a remaining lifespan of components in an image forming apparatus to the image forming apparatus or an external apparatus, according to an example.

FIG. 10 is a diagram for explaining a process of providing guide information obtained based on remaining lifespan of components in the image forming apparatus 10 to the image forming apparatus 10 or the external electronic apparatus 20, according to an example.

The image forming apparatus 10 may refill a toner and continue an image forming job when the toner is consumed through the image forming job. The image forming apparatus 10 may determine refill capacity of the toner to be refilled in a cartridge based on the remaining lifespan of the components in the image forming apparatus 10.

In an example, the image forming apparatus 10 may detect an operation of refilling the toner in the cartridge. Before the toner is refilled in the cartridge, the image forming apparatus 10 may calculate the remaining lifespan of the components in the image forming apparatus 10. Here, the image forming apparatus 10 may calculate remaining lifespan of components in the cartridge and the remaining lifespan of the components in the image forming apparatus 10 independently replaceable with the cartridge. Here, the remaining lifespan of the components in the cartridge may affect replacement timing of the cartridge. When a first component in the cartridge is consumed and a function of the first component is not performed, the cartridge in the image forming apparatus 10 may be replaced.

As shown in FIG. 10, the image forming apparatus 10 may confirm remaining lifespan of the cartridge, an imaging unit, a fuser, and a roller waste box in the image forming apparatus 10. The image forming apparatus 10 may confirm the remaining lifespan of the components and generate guide information for guiding a refilling operation of the toner. The image forming apparatus 10 may display the guide information for guiding the refilling operation of the toner through the user interface apparatus 250.

Further, the image forming apparatus 10 may transmit the guide information to the external electronic apparatus 20 through a communication apparatus. Here, the external electronic apparatus 20 may be the electronic apparatus 20 of a user using the image forming apparatus 10. The external electronic apparatus 20 may display the guide information through a display. That is, when the user interface apparatus 250 is not installed in the image forming apparatus 10, the image forming apparatus 10 may transmit the guide information to the external electronic apparatus 20. The external electronic apparatus 20 may display information, messages, and data displayed on the user interface apparatus 250 described in FIGS. 1 to 9 through the display of the external electronic apparatus 20. The image forming apparatus 10 may also transmit the guide information to a server that manages the image forming apparatus 10 and to a web providing a service related to the image forming apparatus 10.

Figure 11:
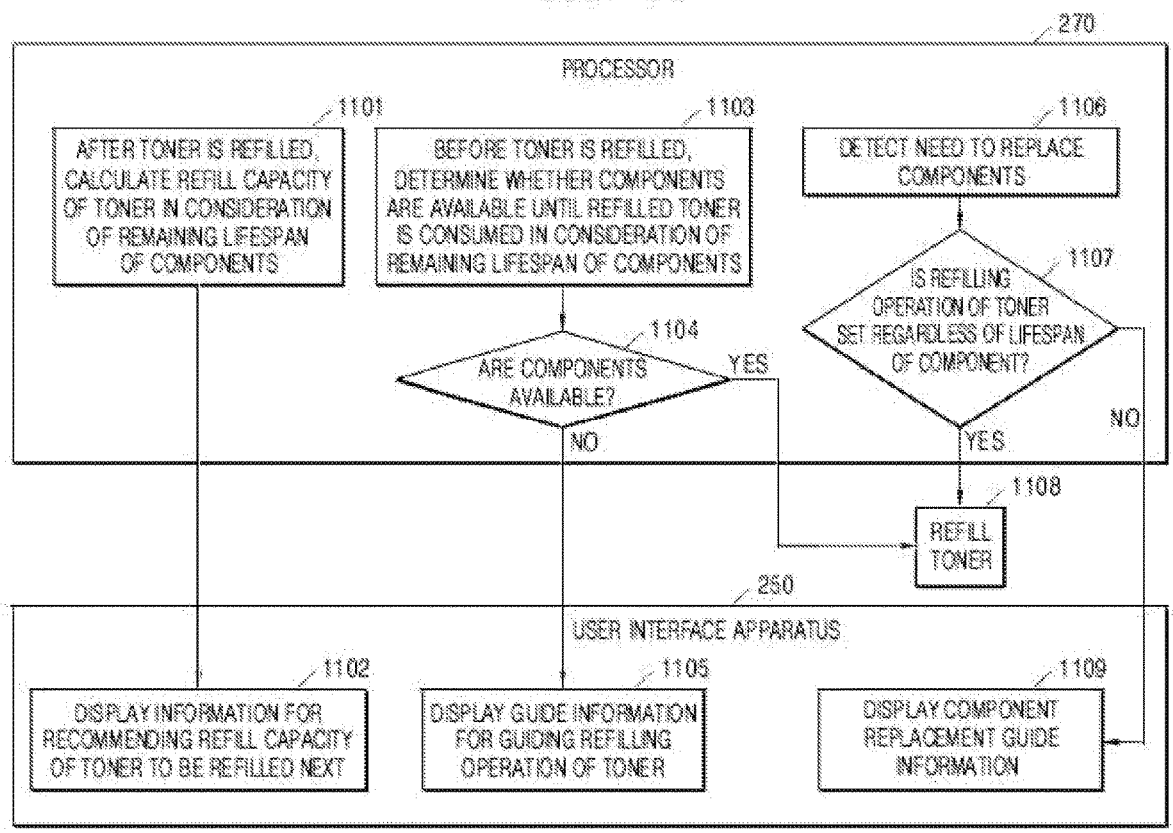
FIG. 11 is a diagram for explaining a process performed by an image forming apparatus to display information on a user interface apparatus according to a toner refilling operation or a component replacement operation, according to an example.

FIG. 11 is a diagram for explaining a process performed by an image forming apparatus of displaying information on a user interface apparatus according to a toner refilling operation or a component replacement operation, according to an example.

In block 1101, when a toner is refilled in the image forming apparatus 10, a processor in the image forming apparatus 10 may calculate remaining lifespan of components in the image forming apparatus 10 and remaining amount of the toner when an image forming job is performed. The processor may calculate refill capacity of the toner to be refilled next when the toner is consumed, based on the remaining lifespan of the components and the remaining amount of the toner.

In block 1102, the user interface apparatus 250 of the image forming apparatus 10 may display information for recommending the refill capacity of the toner to be refilled next.

In block 1103, before the toner is refilled to the image forming apparatus 10, the processor may determine, based on the remaining lifespan of the components, whether the components are available until the refilled toner is consumed.

In block 1104, when the components are not available until the refilled toner is consumed, then the image forming apparatus 10 may perform an operation according to block 1105. Otherwise, when the components are available until the refilled toner is consumed, the image forming apparatus 10 may perform an operation of refilling the toner to the cartridge, according to block 1108.

In block 1105, the user interface apparatus 250 may display guide information for guiding the refilling operation of the toner. In an example, when a first replacement timing is based on remaining lifespan of a first component of the components before a timing at which the toner refilled through the refilling operation is consumed, the user interface apparatus 250 may display a message informing that the first component is not available until the toner refilled through the refilling operation is consumed.

In block 1106, the processor may detect a need to replace a second component of the components in the image forming apparatus 10. Here, the second component may be consumed due to an image forming job, and a state of the second component may be a state where remaining lifespan is consumed or the remaining lifespan is short.

In block 1107, the processor may confirm whether the refilling operation of the toner is set regardless of lifespan of a component to be replaced. When the refilling operation of the toner is set regardless of lifespan of the component to be replaced, the image forming apparatus 10 may perform the refilling operation of the toner when the toner is wholly consumed according to block 1108. Otherwise, when the refilling operation of the toner is not set regardless of lifespan of the component to be replaced, the image forming apparatus 10 may perform an operation according to block 1109.

In block 1109, the user interface apparatus 250 may display replacement guide information for the component to be replaced. In an example, the user interface apparatus 250 may display information showing details of how to replace the second component in the image forming apparatus 10, or contact information of a service provider of the image forming apparatus 10. Also, the user interface apparatus 250 may display guide information for guiding the refilling operation of the toner after the second component is replaced.

Figure 12:
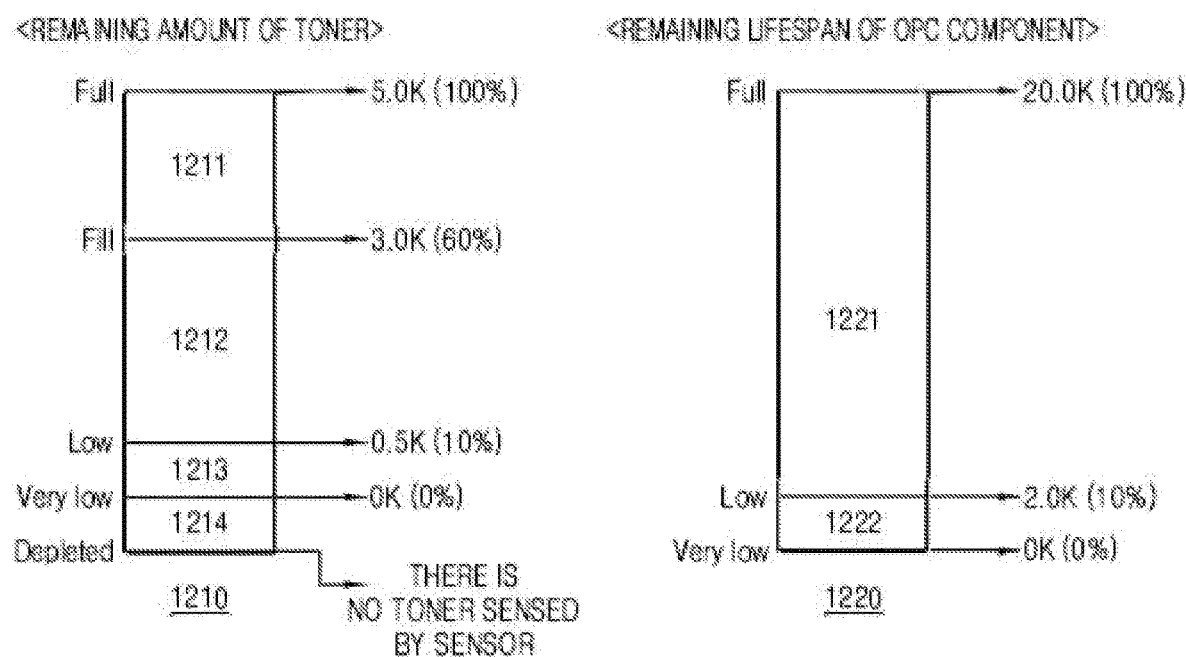
FIG. 12 is a diagram for explaining a level corresponding to a remaining amount of toner and a level corresponding to a remaining lifespan of an OPC component, according to an example.

FIG. 12 is a diagram for explaining a level corresponding to a remaining amount of toner and a level corresponding to a remaining lifespan of an OPC component, according to an example.

Referring to an image 1210 in FIG. 12, the level may be determined according to the remaining amount of toner. For example, the image forming apparatus 10 may set a section in which the remaining amount of toner is more than 60% and 100% or less as a first section 1211. When the remaining amount of toner is included in the first section 1211, the image forming apparatus 10 may determine the level corresponding to the remaining amount of toner to a full level. When a toner amount charged in a TRK is 2K, the image forming apparatus 10 may determine that a refill operation by the TRK is impossible, and display information indicating impossibility.

In another example, the image forming apparatus 10 may set a section in which the remaining amount of toner is more than 10% and 60% or less as a second section 1212. When the remaining amount of toner is included in the second section 1212, the image forming apparatus 10 may determine the level corresponding to the remaining amount of toner as a fill level. When the amount of toner charged in the TRK is 2K, the image forming apparatus 10 may determine that the refill operation by the TRK is possible once, and display information indicating that the refill operation is possible once.

In another example, the image forming apparatus 10 may set a section in which the remaining amount of toner is more than 0% and 10% or less as a third section 1213. When the remaining amount of toner is included in the third section 1213, the image forming apparatus 10 may determine the level corresponding to the remaining amount of toner to a low level. When the amount of toner charged in the TRK is 2K, the image forming apparatus 10 may determine that the refill operation by the TRK is possible twice, and display information indicating that the refill operation is possible twice. Here, when the refill operation is performed by the TRK once, the image forming apparatus 10 may display information indicating that the refill operation may be performed once.

In another example, the image forming apparatus 10 may set a section in which the remaining amount of toner is 0% to a fourth section 1214. Here, the remaining amount of toner may be sensed by a sensor provided in the image forming apparatus 10. When the remaining amount of toner is included in the fourth section 1214, the image forming apparatus 10 may determine the level corresponding to the remaining amount of toner to be a very low level. When the amount of toner charged in the TRK is 2K, the image forming apparatus 10 may determine that the refill operation by the TRK is possible twice, and display information indicating that the refill operation is possible twice. Here, when the refill operation is performed by the toner reload kit once, the image forming apparatus 10 may display information indicating that the refill operation may be performed once.

Referring to an image 1220 of FIG. 12, the level may be determined according to the remaining lifespan of the OPC component. For example, the image forming apparatus 10 may set a section in which the remaining lifespan of the OPC component is more than 10% and 100% or less as a first section 1221. When the remaining lifetime of the OPC component is included in the first section 1221, the image forming apparatus 10 may determine the level corresponding to the remaining lifespan of the OPC component to a normal level.

In another example, the image forming apparatus 10 may set a section in which the remaining lifespan of the OPC component is more than 0% and 10% or less as a second section 1222. When the remaining lifetime of the OPC component is included in the second section 1222, the image forming apparatus 10 may determine the level corresponding to the remaining lifespan of the OPC component to a low level.

In another example, the image forming apparatus 10 may set a section in which the remaining life of the OPC component is 0% to a third section (not shown). When the remaining lifespan of the OPC component is included in the third section (not shown), the image forming apparatus 10 may determine the level corresponding to the remaining lifespan of the OPC component to a very low level. Even though the level corresponding to the remaining lifespan of the OPC component is the very low level, the image forming apparatus 10 may not restrict a printing job.

The level corresponding to the remaining amount of toner and the level corresponding to the remaining lifespan of the OPC component described in FIGS. 13A to 13D are the same as the level corresponding to the remaining amount of toner and the remaining lifespan of the OPC component described in FIG. 12, and thus redundant descriptions will be omitted.

Figure 13A:
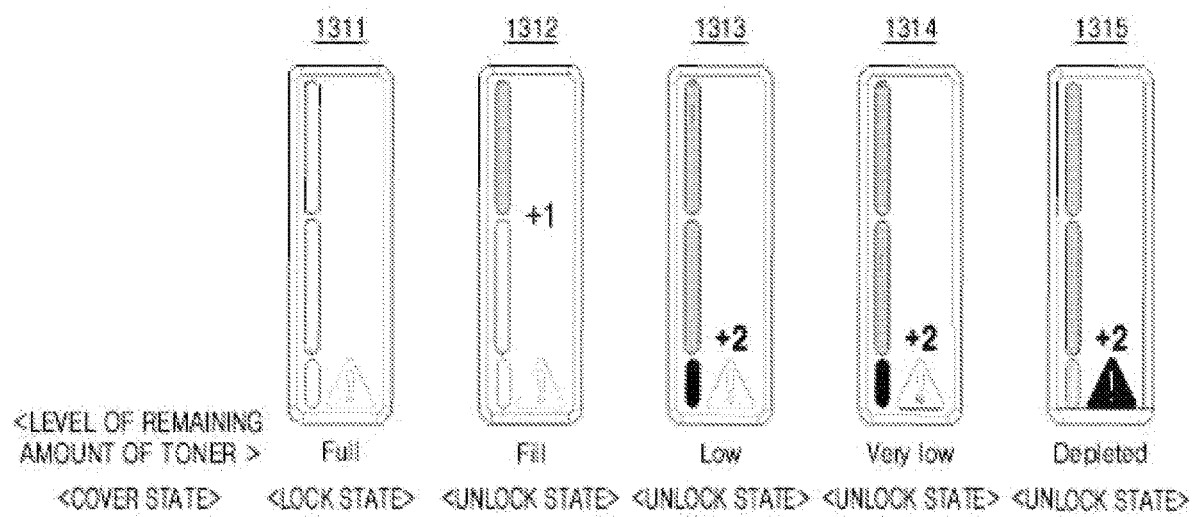
FIGS. 13A to 13D are diagrams for explaining guide information displayed according to a remaining amount of toner and a remaining lifespan of an OPC component, according to an example.

FIG. 13A is a diagram for explaining guide information displayed according to a remaining amount of toner when a remaining lifespan of an OPC component is a normal level according to an example.

When the level corresponding to the remaining lifespan of the OPC component is the normal level, the image forming apparatus 10 may determine whether to perform a refill operation by a TRK depending on the remaining amount of toner, without depending on the remaining lifespan of the OPC component.

Referring to an image 1311 of FIG. 13A, when the level corresponding to the remaining amount of toner is a full level, the image forming apparatus 10 may determine that an amount of toner in a cartridge is sufficient to perform an image forming job and determine not to perform the refill operation. In this case, the image forming apparatus 10 may control an operation of a cover of a toner refill unit such that the cover operates in a lock state.

Referring to an image 1312 in FIG. 13A, when the level corresponding to the remaining amount of toner is a fill level, the image forming apparatus 10 may determine that the refill operation by the TRK is possible once, and display information indicating that the refill operation is possible once. For example, the image forming apparatus 10 may display information about the remaining amount of toner in a bar and display the information indicating that the refill operation is possible once as "+1". In this case, the image forming apparatus 10 may control the operation of the cover such that the cover of the toner refill unit operated in an unlock state.

When the level corresponding to the remaining amount of toner is a low level according to an image 1313 of FIG. 13A, the level corresponding to the remaining amount of toner is a very low level according to an image 1314 of FIG. 13A, or the level corresponding to the remaining amount of toner is a depleted level according to an image 1315 of FIG. 13A, the image forming apparatus 10 may determine that the refill operation by the TRK is possible twice, and display information indicating that the refill operation is possible twice. Here, the depleted level may be a level of a section in which the remaining amount of toner is calculated as zero or a negative number because the toner is completely exhausted in the cartridge. Further, the image forming apparatus 10 may display information indicating the remaining amount of toner in the bar and display the information indicating that the refill operation is possible twice as "+2". Here, when the refill operation is performed by the TRK once, the image forming apparatus 10 may display the information indicating that the refill operation is possible once as "+1". In this case, the image forming apparatus 10 may control the operation of the cover of the toner refill unit such that the cover operates in the unlock state.

Figure 13B:
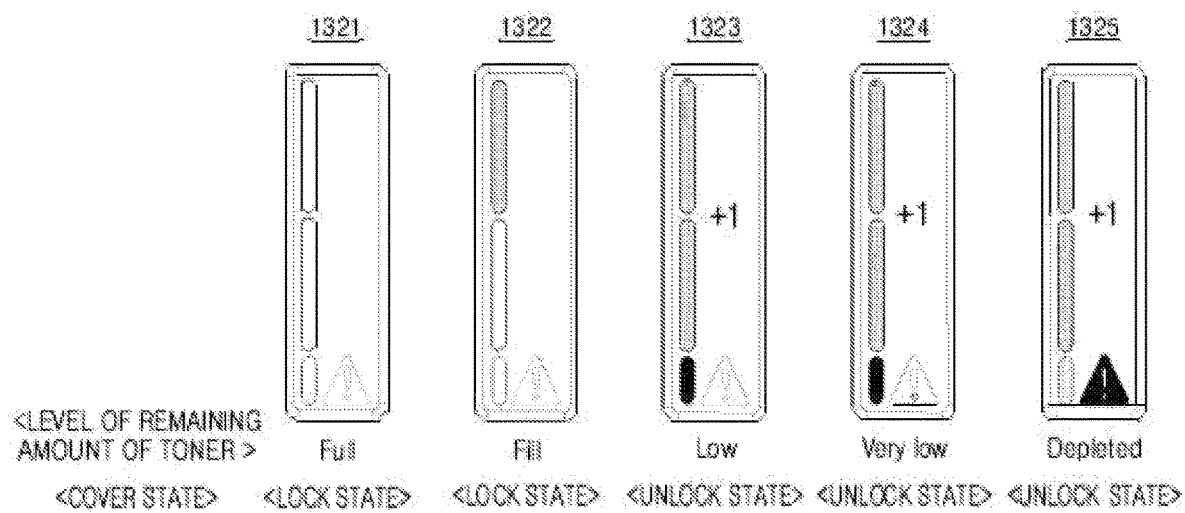

FIG. 13B is a diagram for explaining guide information displayed according to the remaining amount of toner when the remaining lifespan of the OPC component is the low level according to an example.

When the level corresponding to the remaining lifespan of the OPC component is the low level, because an image forming workload that may be performed based on the remaining lifespan of the OPC component is less than 2.0 K, when the toner needs to be refilled in the cartridge, it is sufficient that the refill operation is performed by the TRK once.

When the level corresponding to the remaining amount of toner is a full level according to the image 1321 in FIG. 13B, or the level corresponding to the remaining amount of toner is a fill level according to the image 1322 in FIG. 13B, the image forming apparatus 10 may determine that it is unnecessary to refill the toner in the cartridge, and determine not to perform the refill operation. In this case, the image forming apparatus 10 may control the operation of the cover of the toner refill unit such that the cover operates in the lock state.

When the level corresponding to the remaining amount of toner is the low level according to an image 1323 of FIG. 13B, the level corresponding to the remaining amount of toner is the very low level according to an image 1324 of FIG. 13B, or the level corresponding to the remaining amount of toner is the depleted level according to an image 1325 of FIG. 13B, the image forming apparatus 10 may determine that the refill operation by the TRK is possible once, and display information indicating that the refill operation is possible once. The image forming apparatus 10 may display information indicating the remaining amount of toner in the bar and display the information indicating that the refill operation is possible once as "+1". In this case, the image forming apparatus 10 may control the operation of the cover of the toner refill unit such that the cover operates in the unlock state.

Figure 13C:
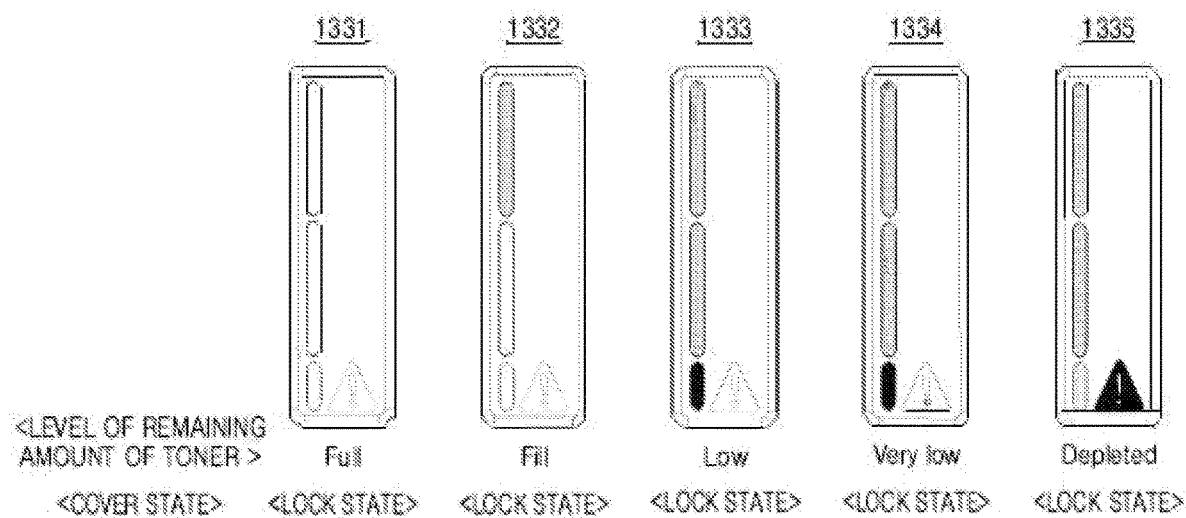

FIG. 13C is a diagram for explaining guide information displayed according to the remaining amount of toner when the remaining lifespan of the OPC component is the very low level according to an example.

When the level corresponding to the remaining lifespan of the OPC component is the very low level, the OPC component must be replaced. Therefore, the image forming apparatus 10 should not perform the refill operation by the TRK. Referring to an image 1331, an image 1332, an image 1333, an image 1334, and an image 1335 in FIG. 13C, the image forming apparatus 10 may determine not to perform the refill operation without depending on the remaining amount of toner. In this case, the image forming apparatus 10 may control the operation of the cover of the toner refill unit such that the cover operates in the lock state.

Figure 13D:
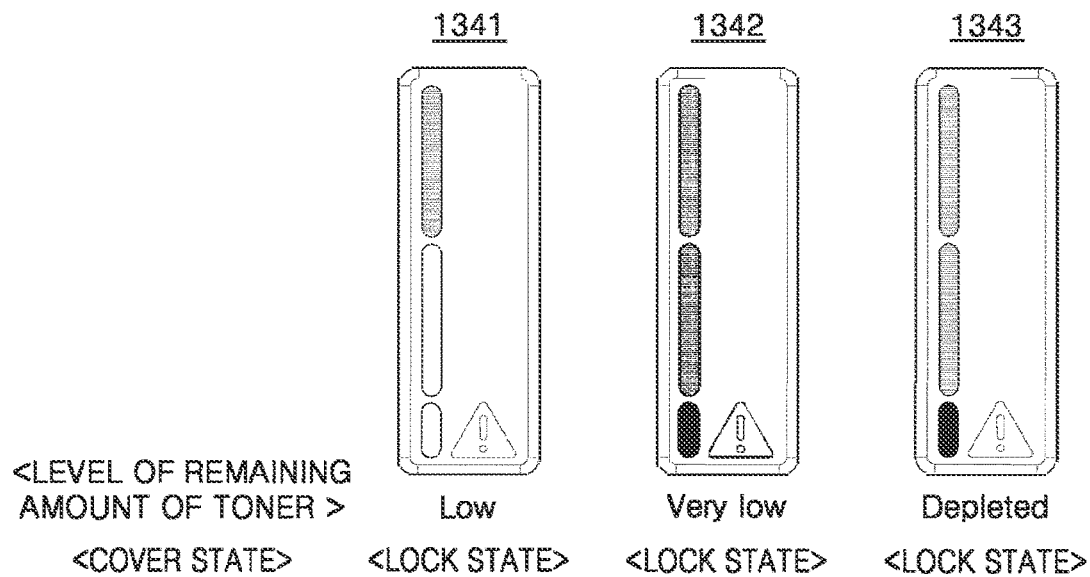

FIG. 13D is a diagram for explaining guide information displayed according to the remaining amount of toner when the remaining lifespan of the OPC component is a limbo level according to an example.

When the remaining lifespan of the OPC component is uncertainly calculated, the image forming apparatus 10 may determine the level corresponding to the remaining lifespan of the OPC component as the limbo level. The image forming apparatus 10 may not perform the refill operation by the TRK. Referring to an image 1341, an image 1342, and an image 1343 in FIG. 13D, the image forming apparatus 10 may determine not to perform the refill operation without depending on the remaining amount of toner. In this case, the image forming apparatus 10 may control the operation of the cover of the toner refill unit such that the cover operates in the lock state.

The above-described methods of operating the image forming apparatus 10 and the electronic apparatus 20 may be embodied in form of a computer-readable recording medium storing computer-executable instructions or data. The above-described examples may be written as computer programs and may be implemented in general-use digital computers that execute the programs using a computer-readable recording medium. Examples of the computer-readable recording medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and any device capable of storing machine readable instructions, related data, a data file, and data structures and providing the machine readable instructions, the related data, the data file, and the data structures to a processor or a computer such that the processor or the computer execute the instruction.

While the disclosure has been particularly shown and described with reference to examples thereof, it will be understood by those of ordinary skill in the art that various changes in form and details may be made therein without departing from the spirit and scope of the disclosure as defined by the following claims. In an example, an appropriate result may be attained even when the above-described techniques are performed in a different order from the above-described method, and/or components, such as the above-described system, structure, device, and circuit, are coupled or combined in a different form from the above-described methods or substituted for or replaced by other components or equivalents thereof.

What is claimed is:

1. An image forming apparatus comprising:
   a communication device to communicate with an external apparatus;
   a processor; and
   a memory to store instructions executable by the processor, wherein the processor executes the instructions to:
   calculate a remaining lifespan of at least one component consumed through use in the image forming apparatus, the at least one component including a first component;
   obtain refill capacity information indicating a refill amount to be refilled in a cartridge through a refill operation when a preparation operation for starting the refill operation is sensed;
   determine whether to proceed with the refill operation based on the remaining lifespan of the at least one component and the refill amount to be refilled indicated by the obtained capacity information; and
   display guide information to guide the refill operation, based on a result of the determining whether to proceed, wherein the displaying the guide information comprises:
   when a first replacement timing of when the first component becomes unavailable to be consumed based on a remaining lifespan of the first component is before the refill amount to be refilled through the refill operation is consumed, displaying that the remaining lifespan of when the first component becomes unavailable is before the refill amount to be refilled through the refill operation is consumed.

2. The image forming apparatus of claim 1,
   wherein the at least one component comprises at least one cartridge component in the cartridge and at least one independent component replaceable independently of the cartridge, and
   wherein the processor executes instructions to:
   calculate a remaining lifespan of the at least one cartridge component consumable through use based upon an image forming job;
   determine a replacement timing of the cartridge based on the remaining lifespan of the at least one cartridge component; and
   calculate a remaining lifespan of the at least one independent component.

3. The image forming apparatus of claim 1, wherein the processor executes instructions to:
   display that the remaining lifespan of when the first component becomes unavailable is before the refill capacity refillable through the refill operation is to be consumed.

4. The image forming apparatus of claim 1, wherein the processor executes instructions to:
   determine whether to refill the refill amount, based on a fill level in the cartridge and the remaining lifespan of the first component.

5. The image forming apparatus of claim 4, wherein the processor executes instructions to:
   display the guide information to guide the refill operation based on at least in part the fill level in the cartridge.

6. The image forming apparatus of claim 1, wherein the processor executes instructions to:
   when remaining lifespans of at least two components among the at least one component are to be consumed before the refill capacity refillable through the refill operation is to be consumed, display information indicating a suggestion of stopping the refill operation.

7. The image forming apparatus of claim 1, wherein the processor executes instructions to:
   when a fill level of the cartridge is consumed, calculate the refill capacity based on the remaining lifespan of the at least one component; and
   display information to indicate the refill amount.

8. A non-transitory computer-readable media, comprising computer-readable instructions executable by a processor, wherein the processor executes the computer-readable instructions to:
   calculate a remaining lifespan of at least one component consumed through use in the image forming apparatus, the at least one component including a first component;
   obtain refill capacity information indicating a refill amount to be refilled in a cartridge through a refill operation when a preparation operation for starting the refill operation is sensed;
   determine whether to proceed with the refill operation based on the remaining lifespan of the at least one component and the refill amount to be refilled indicated by the obtained capacity information; and
   display guide information to guide the refill operation, based on a result of the determining whether to proceed, wherein the displaying the guide information comprises:
   when a first replacement timing of when the first component becomes unavailable to be consumed based on a remaining lifespan of the first component is before the refill amount to be refilled through the refill operation is consumed, displaying that the remaining lifespan of when the first component becomes unavailable is before the refill amount to be refilled through the refill operation is consumed.

9. The non-transitory computer-readable media of claim 8, wherein the processor executes computer-readable instructions to:
   control an operation of a refill unit, the refill unit to receive a reload kit, wherein the reload kit is to refill the refill amount to refill the cartridge through the refill operation, based on a result of the determining whether to proceed with the refill operation.

10. The non-transitory computer-readable media of claim 9, wherein the processor executes computer-readable instructions to:
control an operation of a cover of the refill unit to be locked when a first image forming workload to be performed based on the remaining lifespan of the first component is smaller than a second image forming workload to be performed based on a supplied refill amount from the reload kit or when a fill level of the cartridge exceeds a reference amount; and
control the cover of the refill unit to be unlocked when the first image forming workload exceeds the second image forming workload.

11. The non-transitory computer-readable media of claim 9, wherein the processor executes computer-readable instructions to:
determine a number of times refillable by the reload kit, based on at least a fill level in the cartridge; and
display the number of times refillable.

12. The non-transitory computer-readable media of claim 11, wherein in order to determine the number of times refillable by the reload kit, the processor executes computer-readable instructions to:
set a first section, in which the fill level in the cartridge is in a first range;
set a second section, in which the fill level in the cartridge is in a second range; and
determine whether the fill level is in the first section or the second section.

13. The non-transitory computer-readable media of claim 12, wherein the processor executes computer-readable instructions to:
not perform the refill operation when the fill level is in the first section; and
perform the refill operation when the fill level is in the second section.

14. The non-transitory computer-readable media of claim 8, wherein the processor executes computer-readable instructions to:
transmit the guide information to at least one among a server managing the image forming apparatus or an electronic apparatus of a user using the image forming apparatus.

15. A method by an image forming apparatus, the method comprising:
calculating a remaining lifespan of at least one component consumable through use in the image forming apparatus, the at least one component including a first component;
obtaining refill capacity information indicating a refill amount to be refilled in a cartridge through a refill operation when a preparation operation for starting the refill operation is sensed;
determining whether to proceed with the refill operation based on the remaining lifespan of the at least one component and the refill amount to be refilled indicated by the obtained capacity information; and
displaying guide information to guide the refill operation, based on a result of the determining whether to proceed, wherein the displaying the guide information comprises:
when a first replacement timing of when the first component becomes unavailable to be consumed based on a remaining lifespan of the first component is before the refill amount to be refilled through the refill operation is consumed, displaying that the remaining lifespan of when the first component becomes unavailable is before the refill amount to be refilled through the refill operation is consumed.

16. The method of claim 15, wherein the guide information is based on at least in part, price information, the price information determined according to a price of the at least one component or according to the refill capacity.

17. The method of claim 15,
wherein the refill capacity is a first refill capacity, and
wherein the guide information is determined based on at least the first refill capacity and a second refill capacity.

18. The method of claim 17, comprising, in order to determine the guide information,
comparing a first cost and a second cost, wherein the first cost is a cost expected to be spent according to the first refill capacity, and the second cost is a cost expected to be spent according to the second refill capacity.

19. The method of claim 15, wherein the remaining lifespan of the at least one component is calculated, in real time or at a predetermined time interval.

20. The method of claim 19, wherein the remaining lifespan of the at least one component is updated, based on the calculation.

* * * * *